(12) United States Patent
Mills

(10) Patent No.: US 6,967,598 B2
(45) Date of Patent: Nov. 22, 2005

(54) REDUCED COMPLEXITY MULTI-TURBO MULTI-USER DETECTOR

(75) Inventor: Diane G. Mills, Wilmington, MA (US)

(73) Assignee: BAE Systems Information and Electronic Systems Integration Inc, Nashua, NH (US)

(*) Notice: Subject to any disclaimer, the term of this patent is extended or adjusted under 35 U.S.C. 154(b) by 43 days.

(21) Appl. No.: 10/818,536

(22) Filed: Apr. 5, 2004

(65) Prior Publication Data

US 2005/0185729 A1   Aug. 25, 2005

Related U.S. Application Data

(60) Provisional application No. 60/546,330, filed on Feb. 20, 2004.

(51) Int. Cl.[7] .............................................. H03M 7/00
(52) U.S. Cl. ........................................ 341/50; 375/341
(58) Field of Search ........................... 341/50; 375/341, 375/233; 714/755, 758, 786

(56) References Cited

U.S. PATENT DOCUMENTS

| | | | |
|---|---|---|---|
| 6,028,897 A | 2/2000 | Wang | |
| 6,029,264 A | 2/2000 | Kobayashi et al. | |
| 6,166,667 A | 12/2000 | Park | |
| 6,263,467 B1 * | 7/2001 | Hladik et al. | 714/755 |
| 6,298,461 B1 | 10/2001 | Tong et al. | |
| 6,430,722 B1 | 8/2002 | Eroz et al. | |
| 6,499,128 B1 | 12/2002 | Gerlach et al. | |
| 6,510,536 B1 | 1/2003 | Crozier et al. | |
| 6,529,559 B2 | 3/2003 | Crozier et al. | |
| 6,704,376 B2 * | 3/2004 | Mills et al. | 375/341 |
| 6,801,588 B1 * | 10/2004 | Yamaguchi | 375/341 |
| 6,831,574 B1 * | 12/2004 | Mills et al. | 341/50 |
| 2001/0021233 A1 | 9/2001 | Jin | |
| 2001/0025358 A1 | 9/2001 | Eidson et al. | |
| 2002/0007474 A1 | 1/2002 | Fujita et al. | |
| 2003/0028843 A1 | 2/2003 | Chang et al. | |
| 2003/0138035 A1 | 7/2003 | Mills | |
| 2003/0138065 A1 * | 7/2003 | Mills et al. | 375/346 |
| 2003/0182369 A1 | 9/2003 | MacLeod | |
| 2003/0193966 A1 | 10/2003 | Mills | |
| 2003/0204808 A1 | 10/2003 | Mills | |
| 2004/0017863 A1 * | 1/2004 | Learned | 375/340 |
| 2005/0053173 A1 * | 3/2005 | Egnor et al. | 375/341 |

OTHER PUBLICATIONS

Robertson, Patrick et al., "A Comparison of Optimal and Sub-Optimal MAP Decoding Algorithms Operating in the Log Domain", IEEE, 1995, pp 1009-1013.

Hagenauer, Joachim et al., "A Viterbi Algorithm with Soft-Decision Outputs and its Applications", IEEE, 1989, pp 1680-1686.

(Continued)

Primary Examiner—Peguy Jeanpierre
Assistant Examiner—Joseph Lauture
(74) Attorney, Agent, or Firm—Maine & Asmus

(57) ABSTRACT

A reduced complexity Turbo multi-user detector (MUD) processing system in multiple access communications channels that decreases the likelihood of improper decoding of the final values of interest and decreases the computation complexity for each iteration, thereby allowing for a reduction in the number of iterations performed and lowers the overall complexity without negatively impacting performance. In one form the present invention comprises a multi-user detector coupled to two or more decoder sections, two ore more recoders, and a compare and adjust section in such a manner that data flows iteratively to correct for errors in a computationally efficient manner.

29 Claims, 10 Drawing Sheets

OTHER PUBLICATIONS

Pottie, Gregory J. et al., "A Comparison of Reduced Complexity Decoding Algorithms for Trellis Codes", IEEE Journal On Selected Areas in Communications, Dec. 1989, pp 1369-1380, vol. 7 No. 9.

Berrou, Claude et al., "Near Shannon Limit Error—Correcting Coding and Decoding: Turbo-Codes", IEEE, 1993, pp 1064-1070.

Berrou, Claude et al., "Near Optimum Error Correcting Coding and Decoding: Turbo-Codes", IEEE Transactions on Communications, Oct. 1996, pp 1261-1271, vol. 44 No. 10.

Wang, Duanyi et al., "Low Complexity MAP Decoding for Turbo Codes", IEEE, 2000, pp. 1035-1039.

Alexander, Paul D. et al., "Iterative Multiuser Interference Reduction: Turbo CDMA", IEEE Transactions On Communications, Jul. 1999, pp 1008-1014, vol. 47, No. 7.

Poor, H. Vincent, "Turbo Multiuser Detection: An Overview", IEEE 6th Int. Symp. on Spread-Spectrum Tech. & Appli., Sep. 6-8 2000, pp 583-587, NJIT, New Jersey.

Wang, Xiaodong et al., "Iterative (Turbo) Soft Interference Cancellation and Decoding for Coded CDMA", IEEE Transactions On Communications, Jul. 1999, pp 1046-1061, vol. 47 No. 7.

DAS, Suman et al., "Computationally Efficeint Interative Multisuser Detection and Decoding", IEEE, 1998, pp 631-635.

Herzog, Rupert et al., "Iterative Decoding and Despreading improves CDMA-Systems using M-ary Orthogonal Modulation and FEC", IEEE, 1997, pp 909-913.

Jin, Hui et al., "Coding Theorems for Turbo Code Ensembles", Was to be submitted to IEEE Trans. Inform. Theory, Jan. 2001, pp 1-25.

Moher, Michael, "An Interative Multiuser Decoder for Near-Capacity Communications", IEEE Transactions on Communications, Jul. 1998, pp 870-880, vol. 46 No. 7.

Wang, Xiaodong et al., "Turbo Multiuser Detection For Turbo-Coded CDMA", IEEE, 1999, pp 1456-1460.

Benedetto, Serglo et al., "Analysis, Design, and Iterative Decoding of Double Serially Concatenated Code with Interleavers", IEEE Journal on Selected Areas in Communications, Feb. 1998, pp 231-244, vol. 16 No. 2.

Reed, Mark C. et al. "Reduced Complexity Iterative Multi-User Detection for DS/CDMA with FEC", pp 1-5, date unknown.

Reed, Mark C. et al. "Near Single User Performance using Iterative Multi-User Detection for CDMA with Turbo-Code Decoder", pp 1-5, date unknown.

Forney, David G., Jr., "Concatenated Codes", Technical Report, Dec. 1, 1965, pp. 115 total.

* cited by examiner

REDUCED COMPLEXITY MULTI-TURBO MULTI-USER DETECTOR

RELATED APPLICATIONS

This application claims priority to U.S. Application Ser. No. 60/546,330 filed Feb. 20, 2004. This application is also related to U.S. Ser. No. 10/678,203, filed Oct. 3, 2003 and U.S. Patent publication No. 20030182369A1, filed Mar. 25, 2002 entitled "System for Decreasing Processing Time in an Iterative Multi-User Detector System". All applications are incorporated by reference herein for all purposes.

STATEMENT OF GOVERNMENT INTEREST

Portions of the present invention may have been made in conjunction with Government funding and there may be certain rights to the Government.

FIELD OF THE INVENTION

This present invention relates to decoding and more particularly to an efficient scheme for detection and decoding signals in multiple access communications channels.

BACKGROUND OF THE INVENTION

The explosive growth in the demand for wireless communications has been a phenomenal and worldwide event. There are already over 500 million users that subscribe to cellular telephone services and the number is increasing exponentially. The advantages of wireless tools are obvious, and the number of cellular subscribers will soon exceed the number of fixed line telephone installations. Cellular usage is beginning to become the primary phone option, and as more and more content and wireless tools become available, the increase will continue to expand and proliferate across the globe.

In addition to the explosion of cellular usage, there are other wireless implementations such as Internet access, messaging, paging, wireless local area networks (WLANs). With respect to cellular services, the vast majority of users currently subscribe to digital cellular networks, and the typical state of the art cellular handset is based on digital technology such as GSM, TDMA (IS-136) or CDMA (IS-95), although the legacy analog systems using protocols AMPS and TACS are still in operation.

New, emerging receiver processing procedures allow for huge increases in the utilization of multiple access communications, especially in the wireless sector. The tremendous growth and for wireless cellular phones, wireless personal digital assistants (PDA's), laptops and mobile tablets demonstrates the huge volume of traffic and the varying content desired by the public. There are a number of protocols established to define the bandwidth characteristics, including 3G, IEEE 802.11, and Bluetooth, however the number of users and devices requires more users than available bandwidth. The ability to access data and communicate anywhere at anytime has enormous potential and commercial value.

The content of the wireless sector is also changing, with more and more data being transmitted, including Internet connectivity and live feeds. The usage involving personal digital assistants (PDA's) and even smart appliances have created new markets utilizing wireless data communications. And, this wireless phenomenon is not limited to any geographical boundaries, as the growth is occurring around the globe.

Thus, despite the advancements in wireless transmission and reception, there is a growing problem of extracting more information signals within a limited bandwidth. Emerging multiple-access receiver processing procedures allow for multiple users to access the same communications medium to transmit or receive information. In addition to the problems associated with multiple users in a given bandwidth, an additional problem is the inability to process the data in the receivers in real time. Advanced receiver techniques cover several areas, namely interference suppression (also called multi-user detection), multipath combining and space-time processing, equalization, and channel estimation. These various techniques can be mixed and matched depending upon the circumstances. Proper signal processing of transmitter and receiver yield a far greater potential than current systems.

While the discussion herein illustrates wireless communications, the multiple access topology is equally applicable to wired cable systems and local area networks, read/write operations of a disc drive, satellite communications and any application that benefits from processing of digital data from among many multiple sources. The use of the term 'users' is therefore utilized as a convention to describe processing among a plurality of signal sources.

The entire field of digital communications encompasses some sophisticated processing and is deployed in a wide range of applications and electronics. Digital communication techniques are now used for communication of combined audio and video telephony. Communication networking also has exploded as affordable connectivity with greater bandwidth has become available via WiFi, satellite, modulated communications over power lines, cable connections, telephone connections and various hybrid systems.

Regardless of the manner in which the communications are delivered, reliable communications are essential. The quality of the communications depends upon the accuracy with which the transmitted signals match the received signals. While some forms of communications, such as audio, can withstand significant bit loss, digital data communications require greater fidelity in order to be successfully processed. Error control coding is used to provide the required fidelity in the presence of channel noise without increasing the power of the transmitted signal.

Terrestrial and satellite radio systems operate over RF propagation channels that induce signal waveform and spectrum distortions, including signal attenuation and multi-path fading. These applications generally use a Forward Error Correction (FEC) and are designed according to factors such as modulation formats, error control schemes, demodulation and decoding techniques and hardware components to optimize system performance and implementation complexity. Advanced techniques such as multi-user detection and error correction are also used in applications other than wireless communications and data networking systems. For example, the storage and subsequent retrieval of stored computer data utilizes error correction techniques to ensure exact fidelity of the data. Equipment such as compact disc players, digital audio tape recorders and players also employ error correction techniques to provide high fidelity output. However, for convenience, a further discussion of multiple access wireless communications is included herein to describe processing of data with error corrections.

Existing wireless communication systems generally employ a match between the transmitter encoding and the receiver decoding schemes. The transmitter typically incorporates one or more encoders, one or more interleavers, a symbol generator (i.e. bit to symbol mapper) and modulator.

Input data bits to be transmitted are input to the encoder that can encompass one of the various error correction encoders such as Reed Solomon, convolutional encoder, and parity bit generator. The function of each encoder is to add redundancy to enable detection and/or correction of errors in transmission. The output bits from the encoder may then be interleaved wherein the order of the bits is changed to more efficiently combat burst errors. The re-arrangement of the bits caused by interleaving improves the resistance to error bursts while adding latency and delay to the transmission. The first encoder is called the outer encoder and the second encoder is called the inner encoder. The purpose of applying two encoders rather than one (more complex) more powerful code is to reduce the decoding complexity required at the receiver while combating the effects of different types of transmission errors, such as burst errors caused by channel fading as well as random bit errors caused by white noise.

The output bits from the second interleaver are then mapped to symbols by a bit to symbol mapper, wherein the bit to symbol mapper transform the bits to modulator symbols. For example, an 8-PSK (phase-shift keying) modulator uses 8 symbols and the mapper takes three bits and converts them to one of eight symbols. Thus, the bit to symbol mapper generates a symbol for every three input bits in that example.

The output from the symbol mapper is input to a modulator that receives symbols in the M-ary alphabet and generates the analog signal that is subsequently transmitted over the channel by an antenna in wireless applications. The channel may comprise a mobile wireless channel, such as cellular or satellite. There can also be hard wired channel, such as a cable such as Ethernet. The industry strives for a transmitter that generates a signal in such a way that is correctly reconstructed by the receiver.

At the receiver, the analog signal from the channel is input to a front end section that demodulates and samples the received signal to generate received samples y(k). There can also be amplification and filtering at the receiver to boost signal levels and eliminate or reduce noise components. The samples are input to a signal processor such as an equalizer that compensates for the inter-symbol interference (ISI) caused by the delay and time spreading of the channel in attempting to detect the symbols transmitted by the modulator.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

In operation, a plurality of spread information signals, such as binary phase shift keying (BPSK) or quadrature phase shift keying (QPSK) modulation, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

A signature sequence is normally used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol. The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits, where the code is a block or convolutional code. Also, the signature sequence can be much longer than a single transmitted symbol, in which case a subsequence of the signature sequence is used to spread the information bit.

Multipath dispersion occurs when a signal proceeds to the receiver along not one but many paths so that the receiver encounters echoes having different and randomly varying delays and amplitudes. Co-channel interference refers to signals received from other users either directly or reflected. The receiver receives a composite signal of multiple versions of the transmitted symbol that have propagated along different paths, called rays, having different relative time. Each distinguishable ray has a certain relative time of arrival, a certain amplitude and phase, and as a result, the correlator outputs several smaller spikes. RAKE receivers are well known and attempt to 'rake' together all the contributions to detect the transmitted symbol and recover the information bit.

Conventional RAKE receivers provide satisfactory performance under ideal conditions, however the signature sequence must be uncorrelated with time shifted versions of itself as well as various shifted versions of the signature sequences of the other CDMA signals. If one received signal corresponding to the signature sequence of interest has a non-negligible cross correlation with the received signal originating from another transmitter, then the value measured at the receiver, e.g. the correlation value for the signal of interest, is corrupted. In other words, the correlation computed at the receiver that would be used to decode a particular signal of interest is overwhelmed by an interfering signal; this is referred to as the near-far problem. The interference caused by an echo of one transmitted symbol overlapping with the next transmitted symbol must also be negligible. If this is not true, the transmitted symbols interfere with past and future transmitted symbols, commonly referred to as intersymbol interference (ISI). In actuality, performance is degraded by other signal interference and ISI.

There has been much research to address signal interference with known multipath time dispersion. This is termed joint demodulation with no multipath and is further described in S. Verdu, "Minimum Probability of Error For Asynchronous Gaussian Multiple-Access Channels," IEEE Trans. Info. Theory, Vol. IT-32, pp. 85–96, R. Lupas and S. Verdu, "Linear multiuser detectors for synchronous code-division multiple-access channels," IEEE Trans. Inform. Theory, Vol. 35, pp. 123–136, January 1989; and R. Lupas and S. Verdu, "Near-far resistance of multiuser detectors in asynchronous channels," IEEE Trans. Commun., Vol. 38, pp. 496–508, April 1990.

There are a host of approaches for jointly demodulating any set of interfering digitally modulated signals, including multiple digitally modulated signals. Maximum Likelihood Sequence Estimation determines the most likely set of transmitted information bits for a plurality of digital signals without multipath time dispersion. The maximum likelihood joint demodulator is capable, in theory, of accommodating the largest number of interfering signals, but has a prohibitive computational complexity that makes it unrealizable in practice. The decorrelation receiver is another, less computationally complex receiver processing approach that zeroes out or decorrelates the different signals so that they no longer interfere with one another. The decorrelator, as well as virtually every other lower complexity joint demodulator, is not capable of operation when the number of signals is over a set threshold which falls significantly short of the theoretical maximum.

In a real world multi-user system, there are a number of independent users simultaneously transmitting signals. These transmissions have the real-time problems of multipath and co-channel interference, fading, and dispersion that affect the received signals. As known in the art, multiple user systems communicate on the same frequency and at the same time by utilizing parameter and channel estimates that are processed by a multi-user detector. The output of the multi-user detector is an accurate estimation as to the individual bits for an individual user.

Multi-user detection (MUD) refers to the detection of data in non-orthogonal multiplexes. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. Unfortunately, this processing is a computationally complex operation and it is not possible to accomplish in a real-time environment. Thus for those multi-user detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are several suboptimal multiuser detectors that are less computationally complex. One example of suboptimal detectors, called linear detectors, includes decorrelators, minimum mean square error or MMSE detectors, and zero-forcing block linear equalizers. But, linear algebra based MUD (non-iterative) and successive interference cancellation fails for cases of overloaded multiple access systems. One example of overloading is where the number of simultaneous users is doubled relative to existing state of the art. Even for underloaded multiple access systems, the performance of non-iterative MUD and successive interference cancellation degrades significantly as the number of users increases, while the computation complexity of the optimal MUD increases significantly as the number of users increases. The computing problems are so extreme that it requires extensive and expensive hardware as well as complex processing. Moreover, an unreasonable delay would be required to decode each bit or symbol rendering such a system useless in practice.

Low complexity multiuser detectors have been contemplated that use linear multiuser detectors to achieve optimal near-far resistance. (Near-Far Resistance of Multiuser Detectors for Coherent Multiuser Communications, R. Lupas, S. Verdu, IEEE Trans. Commun. Vol 38, no. 4, pp 495–508, April 1990). While providing certain advantages, the performance has not been demonstrably improved. Varanasi and Aazhang proposed a multistage technique as described in the article Near-Optimum Detection in Synchronous Code-Division Multiple Access Systems, IEEE Trans. Commun., vol 39, No. 5, May 1991.

Decorrelating decision feedback detectors (DDFD) have been described by A. Duel-Hallen in Decorrelating Decision-Feedback Multiuser Detector for Synchronous Code-division Multiple Access Channel, IEEE Trans. Commun., vol 41, pp 285–290, February 1993. Wei and Schlegel proposed soft-decision feedback to suppress error propagation of the DDFD in Synchronous DS-SSMA with Improved Decorrelating Decision-Feedback Multiuser Detection, IEEE Trans. Veh. Technol., vol 43, pp 767–772, August 1994.

Another reduced complexity MUD general approach is based on tree-pruning help to some extent to eliminate the proper bit combination from consideration (i.e. prune the proper path in the decision tree) based on information from an unreliable bit estimate. For instance, the M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects and tradeoffs are seen for other tree-pruning based MUD (T-algorithm, etc). To combat improper pruning, basic tree-pruning must ensure that M is "large enough", and therefore still encounters increased complexity for acceptable performance levels when the number of interfering signals and/or ISI lengths are moderate to large.

An illustration of the M-algorithm as a tree-pruning algorithm is a tree made up of nodes and branches. Each branch has a weight or metric, and a complete path is sequences of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric.

In an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA", a system is described in which multiple users transmit coded information on the same frequency at the same time, with the multi-user detection system separating the scrambled result into interference-free voice or data streams.

The turboMUD system generally applies the "turbo principle" by modeling the multiuser channel as a convolutional code, thereby modeling the overall transmitted system as a serial concatenation of two convolutional codes—the actual error correction code and the effects of the modulation and multi-user interference. A MUD algorithm within the TurboMUD system determines discrete estimates of the transmitted channel symbols, with the estimates then provided to a bank of single-user decoders (one decoder for each user) to recover the input bit streams of all transmitted signals. If two codes were employed at the transmitter, the state of the art TurboMUD uses the second error correction code and the channel to form a decoding turbo-loop. The outer decoder is simply applied after the TurboMUD is complete.

In an attempt to provide real-time performance by reducing the computational complexity of an iterative multi-user detector that can produce soft values, the prior references suggests algorithms for examining less than the total number of possibilities for each of the bits of data that are coming in from the multiple users. The "shortcuts" taken by this reduced complexity approach cause errors and combating these errors by increasing the number of iterations of the system completely nullifies any advantage.

Generally, error control coding expands the information sequence by adding additional bits for error correction/detection. The encoded sequence then contains some constraint or redundancy that is used by the receiver to identify possible errors in the received sequence. For example, if the received sequence does not satisfy parity-check equations, then the receiver detects the existence of some possible errors and corrects them according to the parity check rule. In other words, error correcting codes insert redundancy into digital information streams at the transmitter, thereby reducing susceptibility to noise and increasing receiver reliability. Incorporating error correcting coding at the transmitter allows the receiver to detect and possibly correct errors caused by noise or interference. Various error detection and correction (EDAC) techniques have been developed that effectively enable digital communications despite error rates inherent in digital communications.

Error control codes such as block codes and convolutional codes are usually applied to digital sequences expected to encounter burst and random errors, so that some portion of the errors may be corrected at the receiver. For example, the powerful Reed-Solomon EDAC provides the ability to correct multiple bit errors in high-noise interference environments such as critical space communications. Reed-Solomon coding originated in the article entitled: "Polynomial Codes over Certain Finite Fields" and uses Galois Field arithmetic to map blocks of a communication into larger blocks. In effect, each coded block corresponds to an over-specified polynomial based upon the input block.

It should be understood that convolutional codes are somewhat inefficient at a handling large number of consecutive errors. In order to combat burst error in channels, system transmitters typically apply a block code before the convolutional code, so that the matching receiver must apply a block decoder after convolutional decoding. The block code recognizes an error condition and realizes certain erasures or indeterminate bits, depending on decoding sequence wherein the code. For a certain minimum number of erasures, it is able to correct for the indeterminate bits, as the block code operates according to expected results depending upon the decoding method. The block decoding calculates some number that matches the code book set which indicates the expected bits at certain location, and generates s a flag if the expected bits do not match the code book set. For example, if the decoding processing knows that the book set can only have '10101 . . . ' and the decoded bit stream is '01101 . . . ', a flag is generated indicating a possible error condition of the first two bits.

One way to create the redundancy needed for error correction is by appending additional bits to fixed-length blocks of source data and transmitting the composite signal at a higher data rate. Alternatively, trellis codes, such as convolutional codes, can add redundancy by outputting specific sequences based on the encoder memory state and current incoming bits. Each transmitted symbol represents not only the current uncoded bit or set of bits, but also contains historical information, reflected in state information that can be derived from the received sequence of symbols. This redundancy permits the transmitted symbol sequence to be accurately reconstructed in a decoding operation even though noise and distortion have altered the message-bearing signal during transmission.

A concatenation of two error correcting codes is sometimes implemented through the use of a concatenated encoding system and a corresponding concatenated decoding system in order to lower the BER to acceptable levels without exponentially increasing the decoder complexity. Concatenated coding refers to the sequence of coding in which a second coding operation is performed upon already encoded data. An "outer code" of the concatenated coding is the first code applied at the transmitter, while the "inner code" of the concatenated coding is the code applied second at the transmitter. Then at the receiver, the decoding process for the inner code is done first, followed by the decoding needed for the outer code.

Concatenating block coding, such as Reed-Solomon, and convolutional coding corrects both burst and random errors in a continuous stream of convolved data bits. The block coding corrects for burst errors while the convolutional coding corrects random errors.

Interleaving is often placed between the two encoders, because when the inner decoder makes erroneous decisions, it tends to create bursts of errors due to the nature of the convolutional code. The interleaving disperses adjacent bit values and prevents a burst error from affecting a sequential run of bits in the original data stream.

Parallel concatenated convolutional codes (PCCC's) or turbo codes have been shown to provide enhanced performance. The use of Turbo codes for error correcting has also enhances the reception capabilities of signals in less than perfect environments. The Turbo codes involve an iterated combination of two or more recursive systematic convolutional codes, where the codes of the encoder output bits include unaltered input bits. The convolutional codes are typically identical and applied to an input bit sequence and an interleaved version of the input bit sequence. In the case of continuous data transmission, turbo coding requires that the data stream be packetized into blocks for processing an entire message by blocks of N data bits.

Turbo codes use an iterative decoding technique wherein each successive decoding step outputs soft decisions usable as input to the next decoding step. The output of the encoder comprises systematic bits, the input bit sequence itself, and parity bits that can be punctured to provide a desired rate of encoding. By employing Turbo codes, the processing can approach the limit of channel capacity in the presence of noise set by the Shannon theorem. The performance of a Turbo Code depends on a number of factors such as the constituent codes, interleaver, information block size and number of decoder iterations. The factors can be tweaked for optimal processing for a particular application. For further details, see C. Berrou et al. entitled "Near Shannon Limit Error-Correcting Coding And Decoding: Turbo-Codes", Proceedings of the IEEE International Conference on Communications, 1993, pages 1064–1070; and Hagenauer, Iterative Decoding of Binary Block and Convolutional Codes, IEEE Transactions on Information Theory, Vol. 42, No. 2 (March 1996).

A typical Turbo encoder uses a parallel concatenation of two systematic and recursive convolutional codes separated by interleaving. The turbo principal originally applied to two codes specifically designed for concatenated operation, has also been applied to other coding environments. For example, the turbo principal was used to develop an error correction coding scheme using three component codes in the paper S. Benedetto, D. Divsalar, G. Montorsi, F. Pollara, in "Analysis, Design and Iterative Decoding of Double Serially Concatenated Codes with Interleavers", IEEE Journal on Selected Areas in Communications, vol 16, no 2, February 1998. Benedetto et al proposed and designed a doubly serially concatenated coding system in which three encoders, all of the same type and all designed specifically to operate well with each other, are concatenated. At the receiver, the turbo principal is applied sequentially to the inner, middle and outer codes to decode the received signal. This double serially concatenated approach addresses the scenario wherein the concatenated codes are either all block codes or all convolutional codes for the inner, middle and outer codes.

As described herein, the "turbo principle" or "turbo decoding" typically refers to the iterative decoding method originally developed for turbo codes, which consist of carefully designed serial-concatenated or parallel-concatenated codes known in the art. The Turbo decoding method is used to achieve high performance for general (non-turbo-coded) systems with concatenated codes or concatenated elements. While the turbo approach was originally employed for single users, it is noted that the effects of multiuser interference can be considered a code-like operation and that a multiuser system with error correction coding benefits from an iterative turbo decoding approach. For example, turboMUD, as described herein, applies the turbo principal to a multiuser interference channel, one convolutional code and one optional interleaver. The channel is modeled as a code and even though the system and components are not a designed turbo code, a turbo loop at the receiver improves the bit error rate performance of the system. For instance, Herzog, Schmidbauer, Hagenauer, "Iterative Decoding and Despreading improves CDMA-Systems using M-ary Orthogonal Modulation and FEC", Proceedings of ICC 97 showed that turbo decoding provides performance gains of more than 1.5 dB over non-iterative decoding for the CDMA system that was examined. Additionally, certain methods to reduce the complexity of the MUD turbo decoding ("turboMUD") have been utilized and are generally successful with the limitations and disadvantages noted herein.

Previous work, referred to as "chained turboMUD" or "multi-turboMUD", is an iterative receiver processing approach that couples multiple turbo-loops to improve performance. For instance, when the transmitter and channel processing chain includes a RS encoder, convolutional encoder, and multi-user channel, forming two turbo loops, one between the MUD and convolutional decoders and one between the convolutional decoders and RS decoders, and then coupling the two loops as described in the pending application Ser. No. 10/678,203 for the invention entitled MULTI-TURBO MULTI-USER DETECTOR which is incorporated herein by reference and improves performance when compared to the partitioned approaches. The multi-turboMUD exploits the variety of relationships between different portions of the received data, created by the redundancies intentionally created by the encoding processes and created (intentionally or not) by the multiple access channel. Corrections to the data by one unit within the receiver can then generate corrections to other portions of the data during subsequent visits to other units within the receiver. That is, corrections propagate through the data during the iterative process and improve the overall reliability of the decoded data delivered to the end-user. However, the technique can be processing-intensive, requiring extensive and expensive hardware, which is a major disadvantage. For instance, when dealing with hand-held communications units such as wireless handsets, the amount of processing within the device is limited, directly limiting the amount of computational complexity that is allowed. The time required for processing is also a major consideration. In order to provide real-time performance both at a cell site and the handset, it therefore becomes important to be able to reduce the amount of computational complexity and processing time so as to achieve real-time performance.

The growing demand for error-free processing of digital signals requires an improvement to the detection and decoding techniques, especially a multi-user environment. What is needed is a practical and workable scheme that improves the bit error rate performance and allows for the reception and detection of a greater number of signals within a limited bandwidth and with greater reliability.

BRIEF SUMMARY OF THE INVENTION

The invention is devised in the light of the problems described herein, and provides a novel and useful decoding technique that can solve the problems noted in the existing systems.

Thus, the present invention addresses the problems associated with decoding in multiple access communications channels. For the same reduced complexity MUD parameters and number of iterations, the present invention provides for superior performance when compared to other reduced-complexity MUD known in the art, followed by a separate decoder for the additional component(s). The new system and method decreases the likelihood of improper decoding of the final values of interest, thereby allowing for a reduction in the number of overall iterations performed and, therefore, a reduction in computational complexity without negatively impacting performance. When compared to full-complexity multi-turboMUD, the computational complexity required by each iteration is significantly lower, which permits practical, real-time implementation.

One aspect of the invention is the incorporation of the results of additional decoder components into the iterative decoding process in a low complexity manner, to improve the performance of a multiuser detector/decoder. Another aspect is applying multi-turbo approach to a system with dissimilar components, such as a combination of convolutional code and block code decoders in conjunction with the other elements of the present invention. This invention solves the problem of computational complexity for multiple access systems that have two or more levels of error correction codes by iteratively applying multiuser detection and the two (or more) error correction decoding algorithms in such a way that the first single-user decoding computation must be performed only once per iteration, rather than multiple times. The additional information provided by the second error correction decoder allows the MUD and the first error correction decoder to improve their estimates with minimal computations required. Therefore, this invention provides a solution to the inadequate performance of systems that do not exploit the decoded information and instead use a partitioned approach to decoding as well as providing a solution to the complexity of a full-complexity multi-turboMUD system.

The improved performance and low complexity of the embodiments encompassing the present invention allows service providers to have more active transmitters (paying customers, users, phones, devices, data storage applications, etc) without requiring more bandwidth (or data storage resources, or other comparable resources) or compromising performance. This new methodology may be used to replace existing receivers without any modification to the transmitters, thereby allowing service providers to offer improved performance without changing the signaling method.

One embodiment of the present invention is a processing system for digitally modulated information having a plurality of received signals, the system comprising a multiuser detector coupled to the received signals, wherein the multiuser detector produces a set of reliability measures for the received signals. There are at least two decoder banks coupled to the multiuser detector, wherein the decoder banks produce a set of conditional probabilities and a set of bit estimates. There are at least two recoder banks coupled to the decoder banks, wherein the recoder banks produce a set of recoded estimates. A compare and adjust unit is coupled to the multiuser detector, the decoder banks and the recoder banks, wherein the compare and adjust unit compares the recoded estimates and the conditional probabilities and produces a set of adjusted estimates. According to one embodiment of the present invention, the adjusted estimates are calculated using a weighting function.

In one aspect, a parameter estimator can be coupled to the multiuser detector. In addition, a filter unit can be coupled to the multiuser detector. The filter unit can be selected from the group of filters consisting of: whitening matched filter bank and matched filter bank. There can also further comprise interleavers and de-interleavers coupled to the multiuser detector, the decoder banks and the recoder banks.

A variation of the system includes wherein the multiuser detector uses algorithms selected from at least one of the group consisting of: optimal joint detection MUD algorithm, M-algorithm, T-algorithm, MT algorithm, Q-algorithm, FANO algorithm, decorrelator MUD algorithm, MMSE MUD algorithm, and decision feedback MUD algorithm.

In one embodiment, at least one of the decoder banks is selected from at least one of the group consisting of: convolutional decoders and block decoders. The decoder banks can further be selected from at least one of the group consisting of: maximum a posteriori (MAP) decoders, soft-output Viterbi algorithm (SOVA) decoders, Bahl, Cocke, Jelinek, Raviv (BCJR) decoders, Reed-Solomon decoders, repetition code decoders, Hamming decoders, BCH decoders, Reed-Muller decoders, Block Cyclic decoders, Hadamard decoders, and Golay decoders.

In one embodiment the system further comprises iterative processing by the decoder banks, the recoder banks, the compare and adjust unit, and the multiuser detector until a final condition is obtained. The final condition can be selected from at least one of the group consisting of: allowable performance level, amount of time, and fixed number of iterations.

One aspect of the present invention is a processing apparatus for multiple access communications channels, comprising a multiuser detector coupled to a plurality of user signals, wherein the multi-user detector produces a set of symbol estimates for each of the user signals. There is a first bank of decoders coupled to the multiuser detector, wherein the first bank of decoders produces a set of bit estimates and a set of soft values for the symbol estimates. There is also a second bank of decoders coupled to the first bank of decoders processing the set of bit estimates and producing a set of hard estimates. A first recoder is coupled to the second bank of decoders, wherein the first recoder recodes the set of hard estimates and produces a set of hard recoded estimates. A second recoder is coupled to the first recoder, wherein the second recoder processes the set of recoded hard estimates and produces a set of hard recoded symbols. There is a compare and adjust unit processing the set of hard recoded symbols and the set of soft values, wherein the compare and adjust unit produces a set of adjusted soft values, and wherein the adjusted soft values are coupled to the multiuser detector for iterative processing. The adjusted soft values can be calculated by a weighting function.

One variation includes wherein the first bank of decoders are convolutional decoders. The convolutional decoders can be selected from at least one of the group consisting of: maximum a posteriori (MAP) decoders, maximum likelihood decoders, soft-output Viterbi algorithm (SOVA) decoders, Bahl, Cocke, Jelinek, Raviv (BCJR) decoders, Fano decoders, sequential decoders, list decoders, and tree-pruning decoders.

A further variation includes wherein the second bank of decoders are block decoders. The block decoders, for example, can be selected from at least one of the group consisting of: Reed-Solomon decoders and repetition code decoders. One aspect also includes wherein the first bank of decoders and the second bank of decoders are selected from at least one of the group consisting of: block decoders and convolutional decoders.

Optionally, a filter unit can be coupled to the user signals and the multiuser detector. The filter unit, for example, can be selected from the group of filters consisting of: whitening matched filter bank and matched filter bank.

In one embodiment the apparatus further comprises iterative processing by the first bank of decoders, the second bank of decoders, the first bank of recoders, the second bank of recoders, the compare and adjust unit, and the multiuser detector until a final condition is obtained. The final condition, for example, can be selected from the group consisting of: allowable performance level, amount of time, and fixed number of iterations.

If required, interleavers and de-interleavers can also be coupled to the multiuser detector, the first bank of decoders and the second bank of decoders.

One method of processing digitally modulated signals, comprises receiving a digital data stream and processing a conditioned digital data stream; performing multiuser detection of the conditioned digital data stream and generating a set of reliability measures; applying an inner decoding process to the conditioned digital data stream producing a set of bit estimates and a set of conditional probabilities; applying an outer decoding process to the bit estimates and producing a set of information bits; re-encoding the information bits using an outer encoding process; re-encoding the information bits using an inner encoding process producing a set of re-encoded estimates; comparing the conditional probabilities to the re-encoded estimates and producing a set of adjusted conditional probabilities for the conditioned digital data stream; and providing a final set of the information bits upon a final condition. The final condition, for example, can be selected from the group consisting of: performance-based metrics, time metrics, and iteration counts.

A variation of the method comprises filtering the digital data stream. Further aspects include steps of interleaving and de-interleaving. Parameter estimation can also be used for processing the conditioned digital data stream.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Figure 1:
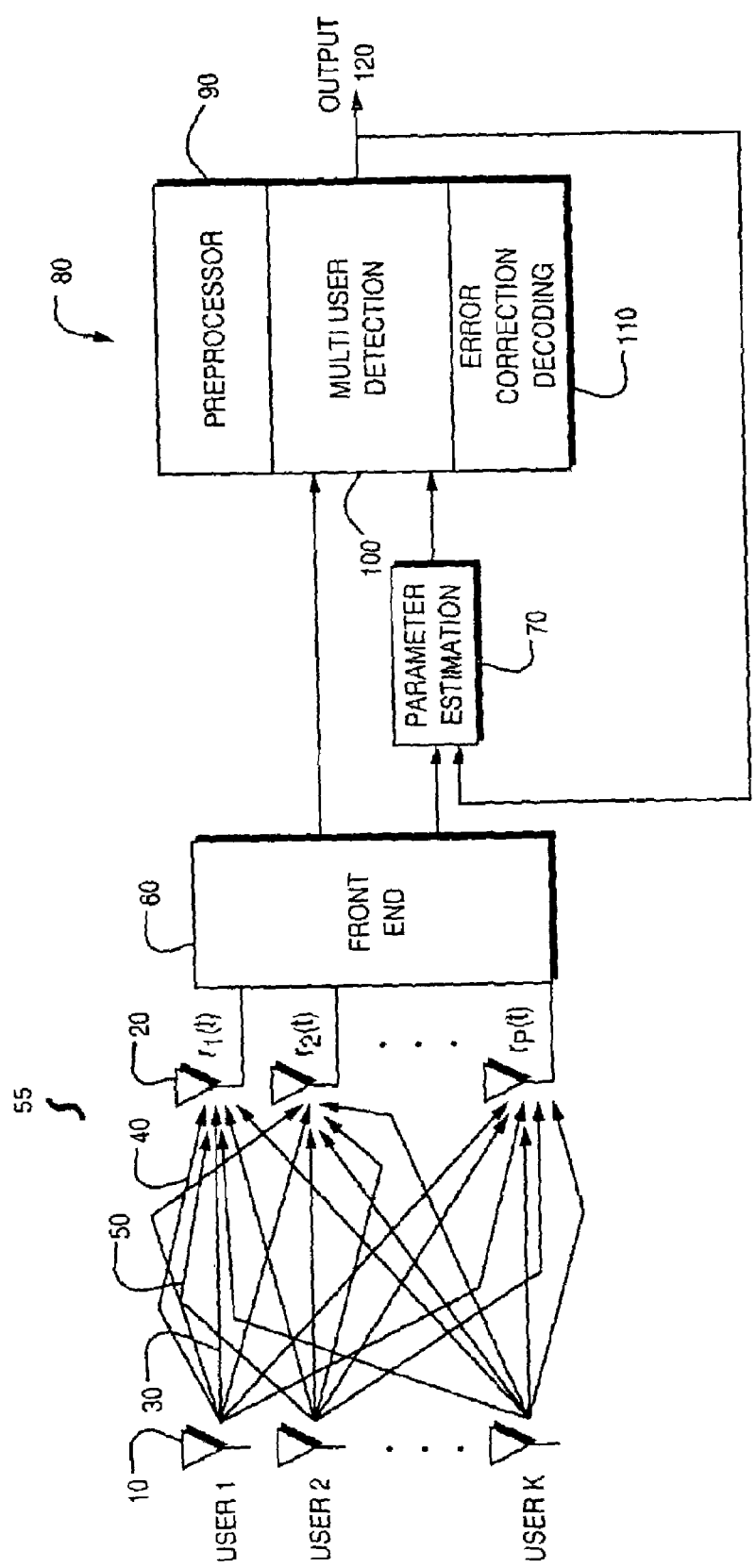
FIG. 1 shows a basic wireless communications system for multiple users illustrating the transmitted signals, reception, basic MUD processing blocks to resolving the user signals.

A typical communication wireless application for the present invention is shown in FIG. 1, wherein a number of users (1 to K) generate signals that are sent by transmitters 10 into free space. There is normally a noise component 55 that is introduced from the environment of a random nature in the received signal. While any noise 55 that has a repeatable or non-random nature can be eliminated or minimized through processing, random noise elements are reduced in other manners. The various signals are received at antennas (1-$p$) 20, wherein there is one signal for each polarization feed. The signals represent directly received signals 30, as well as multi-path signals 40 from the same user, and interfering signals 50 from other users.

The plurality of signals from each antenna 20 is processed in a front end unit 60. The RF front end unit 60 downconverts the higher frequency signals into baseband signals for ease of processing. The baseband signals are also digitized by analog to digital converters (A/D) (not shown). The front end 60 cooperates with the parameter estimation unit 70 to retrieve needed information for the signals such as relative received timing offsets, carrier phase, frequency offsets, received amplitudes, and multipath structure for each of the interfering signals present in the received signal.

The front end unit 60 and the parameter estimator 70 are both coupled to a multi-user detector (MUD) stage 80 for processing of the signals. The MUD stage 80 consists of basic functional blocks of a preprocessor block 90, MUD block 100, one or more error correction decoding blocks 110 that process the digital data and extract the user signals. The format is typically one measurement per 'dimension' per symbol. The preprocessor 90 conditions the signals for improved processing. The multi-user detection stage 100 is detailed herein and cooperates with the error correction decoding (ECD) 110 for iterations of a TurboMUD processing.

The output 120 of the iterative MUD stage 80 is returned for a number of iterations in conjunction with the parameter estimation unit 70 that uses the data from the MUD stage 80 for subsequent processing. When the output K bit stream 120 has reached a certain level of processing, the output signals 120 are forwarded to the output stage (not shown). The number of iterations can be fixed or based on a desired level of processing.

The basic iterative MUD procedure is well known from published literature such as Poor, "Turbo Multiuser Detection: An overview," IEEE $6^{th}$ Int. Symp. On Spread-Spectrum Tech. And Appli., NJIT, New Jersey, Sep. 6–8, 2000 and Alexander, Reed, Asenstorfer, and Schlegel, "Iterative Multiuser Interference Reduction: Turbo CDMA," IEEE Trans. On Comms., v41, n7, July 1999. The iterative MUD is representative of the approaches used to incorporate turbo decoding methods into joint MUD/FEC (Forward Error Correction) decoding and to then reduce the complexity of the system.

It should be readily appreciated that the reference to the iterative embodiment of Turbo-MUD is described herein while the non iterative MUD that runs a single cycle through the process is within the description.

In a communications embodiment, an input signal of raw non-manipulated data from the front end 60 is comprised of the aggregate of many signals from many different transmitters, where each signal is assigned a (frequency, timeslot, and/or spreading code) from a finite set of channels. This digital input signal or raw input data is then input to the multiuser detector (MUD) stage 80. The MUD processing can employ the various state of the art schemes, including maximum likelihood (ML), minimum mean-squared error (MMSE), M-algorithm, T-algorithm, Fano-algorithm and other full or reduced-complexity approaches known to those in the art.

The parameter estimation unit 70 processes the various parameters from the received raw data, and provides certain data to the MUD stage 80. The parameter estimation unit 70 is known in the art, and a detailed description of one such estimation unit is published in patent application U.S. 2002/0037061 A1 entitled "System for Parameter Estimation and Tracking of Interfering Digitally Modulated Signals", which is commonly owned and incorporated by reference for all purposes.

In an optimal case, the MUD block 100 is a full-complexity MAP detector. Suboptimal reduced complexity MAP-based approaches are also known in the relevant art. The bit streams from the MUD block 100 are passed to a bank of error correction decoders 110. In the non-iterative MUD, the raw data is processed by an algorithm of the MUD 100 and the error correction decoders 110 outputs the data stream for each user either in soft or hard output. The iterative MUD or TurboMUD can be structured as a hard output or soft output processing, however in order to demonstrate a working embodiment, the soft output version is addressed herein, but it is well within the scope of the present invention to utilize hard outputs.

In a Turbo-MUD system, decoding and confidence information is passed between the MUD block 100 and decoder block 110. Maximum a posteriori (MAP) decoders (or approximations of MAP decoders) are well known to those in the art and are used for both the MUD and single-user (SU) decoders, so that soft output information is available if desired.

The MUD block 100 outputs a bit (or symbol) stream associated with each interfering signals present on the channel for one data block. Deinterleavers and interleavers (not shown) are optional elements coupled between the MUD block 100 and the decoders 110 that are used if the transmitted signals are interleaved, such as the CDMA format. The MUD block 100 generally passes soft decisions in the form of reliability, or confidence, measures to the decoders 110. The reliability measures are presented with one associated with each symbol of each user to the bank of decoders 110. If the signals were transmitted with interleaving, the reliability measures from the MUD block 100 are first passed through a deinterleaver (not shown) and passed on in shuffled form to the decoder 110. Shuffling refers to processing the same values but changes the placement or presentation of the values. The time-shuffled conditional probabilities are input back to the MUD block 100.

In one known variation, there is a bank of error correction decoders 110 that provide soft output values associated with prior probabilities. Viterbi decoders can be used, but these generally outputs hard values. Single user decoders calculate conditional probabilities, one for each decoded symbol of each user, and output them as confidence values back to the MUD block 100. Soft input soft output decoders, such as MAP or soft-output Viterbi algorithm (SOVA) decoders are examples known in the art.

MAP decoding is well known and further described in C. Schlegel, Trellis Coding, IEEE Press, 1997; Robertson, Villebrun and Hoeher, "A Comparison of Optimal and Sub-Optimal MAP Decoding Algorithms Operation in the Log Domain," ICC95; Hagenauer, and Hoeher, "A Viterbi Algorithm with Soft-Decision Outputs and its Applications," Globecom 89; Pottie and Taylor, "A Comparison of Reduced complexity Decoding Algorithms for Trellis Codes," J Sel. Areas in Comm December 1989. The iterative turbo principle, on which Turbo MUD is based, is described by Berrou, Glavieux, and Thitimajshima, "Near Shannon Limit Error-Correcting Coding and Decoding: Turbo-Codes (1)," ICC 93; Berrou and Glavieux, "Near Optimum Error Correcting Coding and Decoding: Turbo-Codes", Trans on Comm, October 1996; and Wang and Kobayashi, "Low-Complexity MAP Decoding for Turbo Codes", Vehicular Technology Conference 2000]. Turbo MUD approaches are described in, for example, Alexander, Reed, Asenstorfer, and Schlegel, "Iterative Multiuser Interference Reduction: Turbo CDMA," Trans on Comm, July 1999; Poor, "Turbo Multiuser Detection: An Overview, "ISSSTA 2000; and Wang and Poor, "Iterative (Turbo) Soft Interference Cancellation and Decoding for Coded CDMA", Trans on Comm, July 1999.

For TurboMUD processing, soft outputs for each bit of each user from the bank of decoders 110 are fed back to the MUD block 100 for each iteration. The MUD block 100 takes these soft inputs along with the original raw input signal to calculate an improved, less corrupted bit stream for each user. This iterative process continues until the desired quality is reached or a fixed number is reached. At that point, estimates of the data sequences for all active users are output. Operation then commences for the next block of data, repeating the process described above.

The number of iterations for processing between the MUD block 100 and the decoders 110 can be set to a fixed counter or by checking if there were significant changes to the data from the last iteration. Once the data is no longer being altered or reaches a certain iteration counter limit, the data from the decoder 110 can be output 120 as final estimates of what the user sent. As stated, a fixed number of iterations can be stored and used for the processing by the decoder block 110. Alternatively, the information between the MUD block 100 and the decoders 110 can repeat in subsequent iterations until an asymptote is reached or the desired performance level is attained. A buffer can store the previous values and compare them to the latter processed values during the subsequent iterative process.

When processing is completed, the soft output of the bank of error decoders 110 is passed to a hard decision unit (not shown) which outputs the final stream of decisions or output data stream 120 for each interfering user for the current data block.

Figure 2:
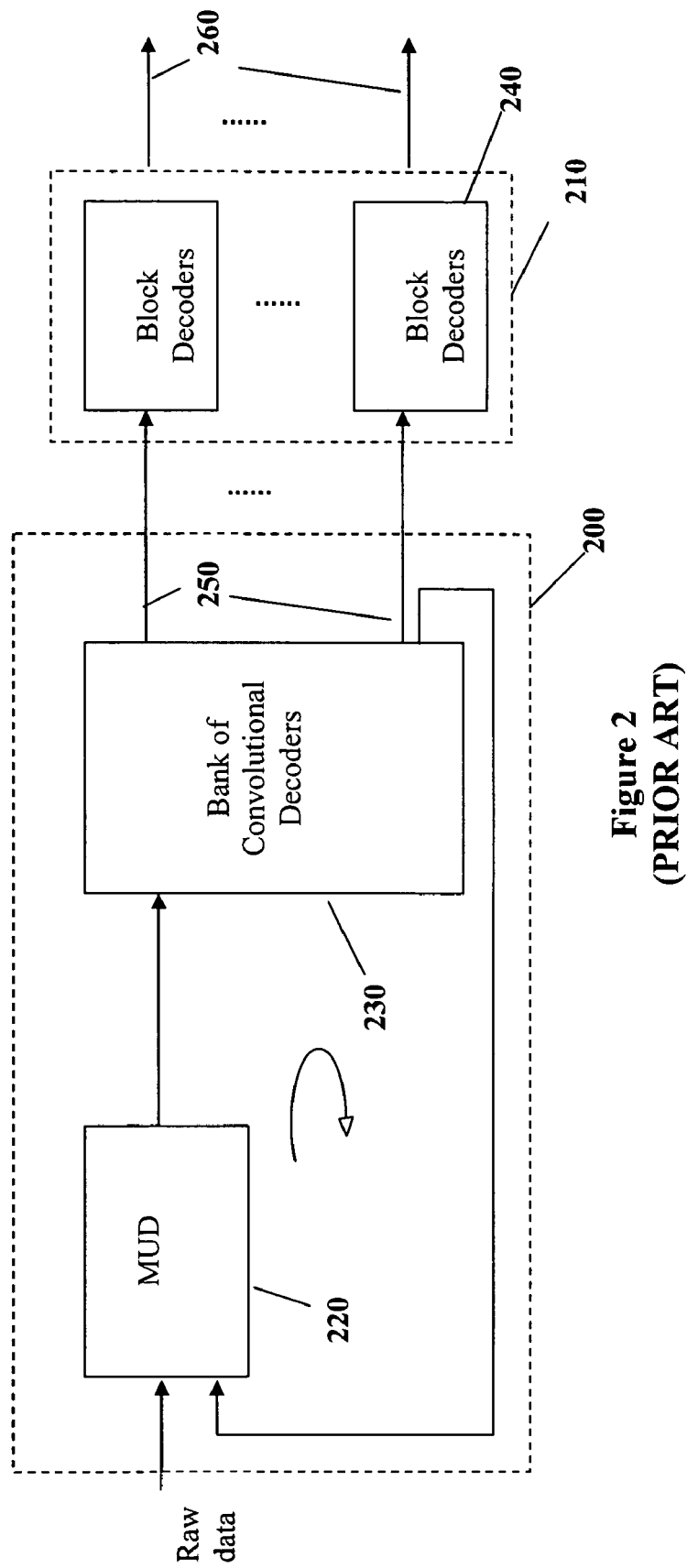
FIG. 2 shows a receiver embodiment comprised of a partitioned TurboMUD and bank of block decoders known in the art.

FIG. 2 shows an existing basic decoder processor block diagram for a doubly encoded signal that encounters multiuser interference, which is addressed with a TurboMUD scheme and separate outer decoder. There are two basic partitioned blocks, namely a TurboMUD block 200 and a decoder block 210. The TurboMUD block 200 has the basic elements such as a MUD section 220 that receive data from a front-end (not shown) along with parameter estimation values as known in the art. The MUD section 220 is coupled to a bank of single user (SU) convolutional decoders 230 for performing some error corrections to the MUD output. The decoders 230 are chosen or configured to match the inner encoding that was implemented at the transmitter for the signal(s) of interest. The output of the (inner) SU decoders 230 goes back to the MUD 220 until certain conditions are satisfied and is then output 250 as hard values to the (outer) block decoder section 210. In this embodiment, the block decoders 210 are a bank of Reed-Solomon decoders 240 for additional processing of the data before outputting estimates of the original data streams 260 for each user.

As detailed herein, Turbo decoding is generally an iterative decoding method originally developed for turbo codes, namely two serially concatenated codes or two parallel concatenated codes. The application of Subsequent turbo decoding methods, known as the "turbo principle", to other systems has been successful, achieving high performance for general systems with concatenated codes.

For instance, the turboMUD system applies the "turbo principle" by modeling the multiuser channel as a convolutional code, thereby modeling the overall transmitted system as a serial concatenation of two convolutional codes—the actual error correction code and the effects of the modulation and multi-user interference. A MUD algorithm within the TurboMUD system determines discrete estimates of the transmitted channel symbols, with the estimates then provided to a bank of single-user decoders (one decoder for each user) to recover the input bit streams of all transmitted signals. Additionally, certain methods to reduce the complexity of the MUD turbo decoding have been utilized and are generally successful with the limitations and disadvantages noted herein.

However, if two codes were employed at the transmitter, the state of the art TurboMUD uses the second error correction code and the channel to form a decoding turbo-loop. The outer decoder is simply applied after the TurboMUD is complete.

A concatenation of two error correcting codes is sometimes implemented through the use of a concatenated encoding system and a corresponding concatenated decoding system in order to lower the BER to acceptable levels without exponentially increasing the decoder complexity. Concatenated coding refers to the sequence of coding in which a second coding operation is performed upon already encoded data. An "outer code" of the concatenated coding is the first code applied at the transmitter, while the "inner code" of the concatenated coding is the code applied second at the transmitter. Then at the receiver, the decoding process for the inner code is done first, followed by the decoding needed for the outer code.

The straightforward (non-iterative) way of decoding the outer code at a receiver in which MUD is implemented is to simply append a bank of decoders to the turboMUD unit wherein FIG. 2 shows the partitioned approach to adding the outer decoder to the receiver. In FIG. 2 the inner code is a convolutional code and the outer code is a block code (such as a Reed-Solomon or repetition code).

Referring again to FIG. 2, it is assumed that parameter estimates are input to the MUD detector 220 along with the raw (measured) data. The MUD detector 220 passes soft decisions in the form of reliability, or confidence, measures to the single user decoders 230. There is one reliability measure associated with each symbol of each user, and the single user decoders 230 calculates both conditional probabilities, one for each decoded symbol of each user, and estimates the decoded bits. The bank of single-user decoders 230 can be any type of decoder, preferably a soft-output decoder such as Bahl, Cocke, Jelinek, Raviv (BCJR) or Soft-output Viterbi Algorithm (SOVA).

The single user decoders 230 use the corrected symbol estimates to update the conditional symbol probabilities transmitted back to the MUD 220. The conditional probabilities are then used by the MUD algorithm 220 to determine new symbol estimates. The single user decoders 230 then recalculate new bit estimates and output these values.

The passing of information between the MUD 220 and the SU decoders 230 repeats in subsequent iterations until an asymptote is reached or the desired performance level is attained. In one embodiment the number of iterations can be a fixed number that is determined to produce satisfactory results within a given time period. Once the TurboMUD section 200 is completed, the data output 250 is passed along to the RS decoders 210 to establish the information sequence estimates. The estimated decoded bits 250 are used by the bank of RS decoders 210 to estimate values for the information bits and output them as final data bit estimates 260. The RS decoding method can be any type of RS decoder known to those in the art. Note that the data and information obtained from the block code processing is not re-introduced into the TurboMUD section 200 for further processing. The interleavers and deinterleavers are not illustrated, but are additional elements that are implemented when the signals of interest emanate from transmitters that employ interleaving.

Figure 3A:
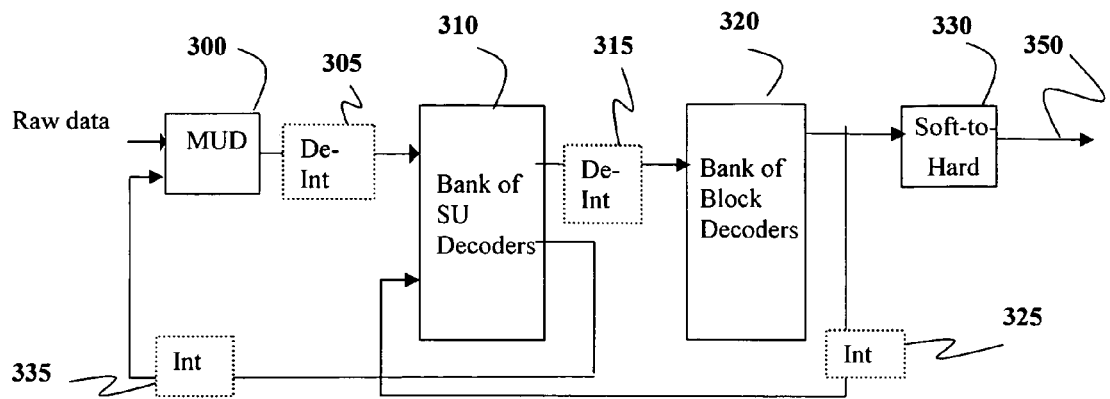
FIG. 3a illustrates a Multi-TurboMUD configuration with an integrated MUD section and two decoder sections.

FIG. 3a illustrates one embodiment depicted in the pending application Ser. No. 10/678,203 for the invention entitled MULTI-TURBO MULTI-USER DETECTOR which is incorporated herein by reference that uses the information derived from block codes such as Reed Solomon decoders 320 and directs the block code decoder outputs back to the convolutional decoders 310 and into the MUD 300 to aid in the correction of errors due to multi-user interference.

Figure 3B:
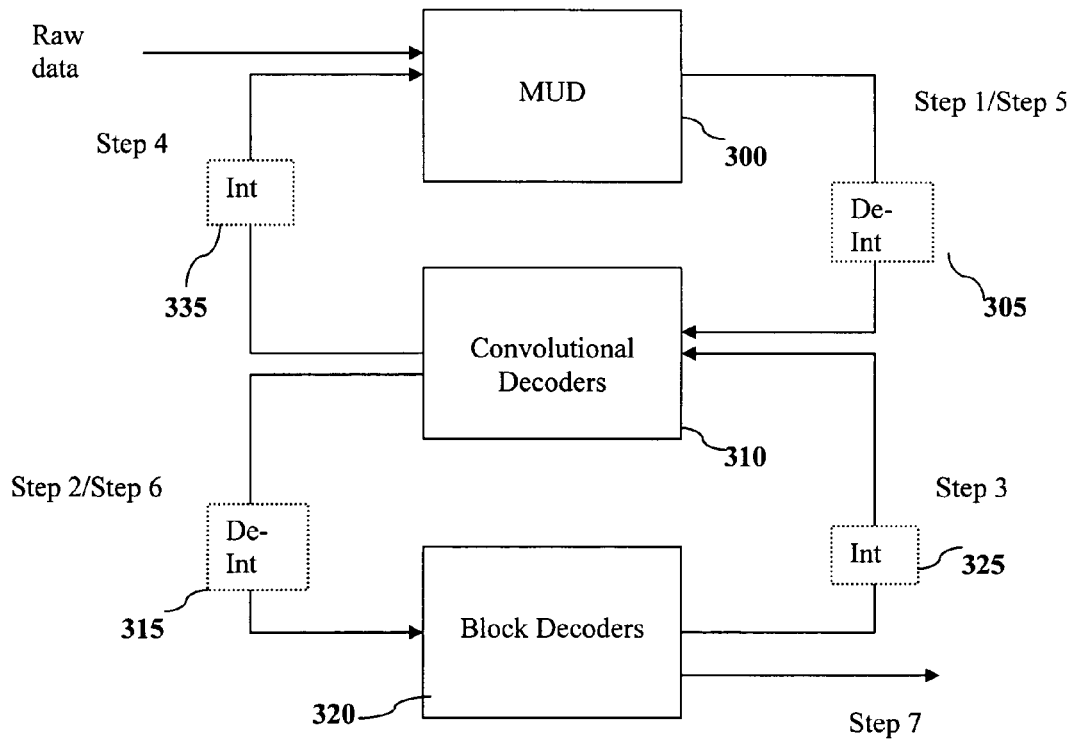
FIG. 3b illustrates the figure-eight process flow of the data through the decoding scheme of FIG. 3a, illustrating the flow through the MUD section, convolutional decoder and block decoder.

Forming two turbo loops, one between the MUD 300 and convolutional decoders 310 and one between the convolutional decoders 310 and RS decoders 320, and coupling the two loops as illustrated in FIG. 3a improves performance when compared to the partitioned approach shown in FIG. 2. The coupling of the turbo-loops is referred to as "chained turboMUD" or "multi-turboMUD" work as depicted in FIGS. 3a and 3b.

Referring again to FIGS. 3a and 3b, the raw data after parameter estimation and optional filtering is input to the MUD detector 300. A filtering unit (not shown) can be incorporated prior to the MUD 300 in order to condition the data in better form for the MUD processing.

The MUD detector 300 passes soft decisions in the form of reliability, or confidence, measures to the single user decoders 310. Optional de-interleavers 305 are used for de-interleaving data. There is one reliability measure associated with each symbol of each user, and the convolutional decoders 310 calculate both conditional probabilities, one for each decoded symbol of each user, along with estimates of the decoded bits. Optional de-interleavers 315 possibly reorder the information, and then the estimated decoded bits are used by the bank of block decoders 320 to estimate values for the information bits and output them as confidence values. These confidence values are interleaved by interleaver 325, which matches the corresponding interleaver at the transmitter, if such an interleaver was used. The single user decoders 310 use these possibly reordered confidence values to update the conditional symbol probabilities. The conditional probabilities are then input back to the MUD algorithm 300 to determine new symbol estimates. If an interleaver was used in the transmitter, the conditional probabilities are reordered by interleaver 335 before being passed to MUD unit 300. The single user convolutional decoders 310 use the new symbol estimates from the MUD unit 300 or optional deinterleaver 315 to recalculate new bit estimates and the new bit estimates are then used by block decoder 320 to update the information sequence estimates.

The passing of information between the MUD 300, the convolutional decoders 310, and the block decoders 320 repeats in subsequent iterations until an asymptote is reached or the desired performance level is attained. At that point, estimates of the information sequences for all active users are output 350. If the block decoders 320 determine soft values, a soft-to-hard conversion unit 330 converts the soft data and hard-valued estimates are output 350.

Operation then commences for the next block of data, repeating the process described above. The MUD unit 300 can contain either a full-complexity MUD algorithm, or a reduced complexity MUD approach such as a MMSE MUD, tree-pruned MUD, or Q-algorithm MUD. The Q-algorithm is disclosed in U.S. patent application Ser. No. 10/105,918, filed Mar. 25, 2002 entitled "System for Decreasing Processing Time in an Iterative Multi-User Detector System" which is incorporated by reference herein for all purposes.

When reduced-complexity MUD approaches are used, the iterative nature of the invention allows for significant reductions in complexity without affecting the performance. The bank of single-user decoders 310 can be any type of decoder, preferably a soft-output decoder such as BCJR or SOVA. The block decoding 320 can be any type of block decoder such as Reed-Solomon (RS).

Thus, the process flows from the MUD 300 that make the original estimates for the data symbols to convolutional decoders 310 for the bits. These estimates by the convolutional decoders 310 are then passed to the block codes 320, such as Reed Solomon decoders, that can detect errors and make corrections based on what the information bit values should be as determined by the code book. The corrected data from the block code 320 is fed back into the convolutional decoders 310 that then pass corrected information to the MUD 300 for further processing.

FIG. 3b illustrates the figure-eight nature of the processing flow for the system shown in FIG. 3a. Referring to FIG. 3b the figure-eight processing is depicted as described herein. The steps of the flow are shown for one iteration (Steps 1 through 7). If more than one iteration is to be done, rather than the Step 7 shown, the figure-eight processing flow continues until all iterations are complete. The raw data is processed by the MUD 300 and de-interleaved as noted for Step 1. The MUD detector 300 passes soft decisions to the bank of convolutional decoders 310. The convolutional decoders 310 calculate conditional probabilities for each decoded symbol of each user, along with estimates of the decoded bits. The estimated decoded bits are then used by bank of block decoders 320 to calculate conditional probabilities for the decoded bits and estimates of the information bits. The convolutional decoders 310 then use these values to update the conditional symbol probabilities which are then input back to the MUD 300 to determine new symbol estimates that are passed back to the convolutional decoders 310. The convolutional decoders 310 use the new symbol estimates and recalculate bit estimates, and these bit estimates are used by the block decoders 320 to update the estimates. Optional interleavers 325, 325 and de-interleavers 305, 315 are used as necessary to match the transmitter operations, as discussed herein.

The multi-turboMUD described in FIGS. 3a and 3b exploits the variety of relationships between different portions of the received data, created by the redundancies intentionally created by the encoding processes and created (intentionally or not) by the multiple access channel. Corrections to the data by one unit within the receiver can then generate corrections to other portions of the data during subsequent visits to other units within the receiver. That is, corrections propagate through the data during the iterative process and improve the overall reliability of the decoded data delivered to the end-user. However, even when reduced complexity MUD and decoder components are used within the multi-turboMUD architecture, the overall complexity can be impractical for certain applications or environments.

Examining FIG. 3b in detail, it should be appreciated that the processing with the overall multi-turboMUD decoder takes on the form of a 'FIG. 8', and for i iterations, the bank of single-user convolutional decoders is visited 2i+1 times, where a partitioned approach corresponds to i=0. In the 'FIG. 8' process flow shown in FIG. 3b, 'i' iterations of overall processing pass thru SU decoders 310 twice as many times in the 'FIG. 8' topology as compared to other decoders. The SU decoders 310 are generally more complex (BCJR or Virtebi) than matrix inverse decoding of block decoders 320, and contribute, along with the MUD processing unit 300, to the majority of the computational complexity. Previous successful attempts to reduce MUD processing complexity will not reduce the number of times that unit 310 must be visited.

Therefore, depending upon the implementation, the multi-turbo MUD receiver shown in FIG. 3a can be processing-intensive, requiring extensive and expensive hardware, which is a major disadvantage. For instance, when dealing with hand-held communications units such as wireless handsets, the amount of processing within the device is limited, directly limiting the amount of computational complexity that is allowed. In order to provide real-time performance both at a cell site and the handset, it therefore becomes important to be able to reduce the amount of computational complexity and processing time so as to achieve real-time performance. The present invention couples the receiver components together in a manner similar to multi-turbo MUD, but reduces the number of times that the bank of inner decoders must be visited in each iteration, thereby reducing overall complexity while still allowing error corrections to propagate through the units.

Figure 4:
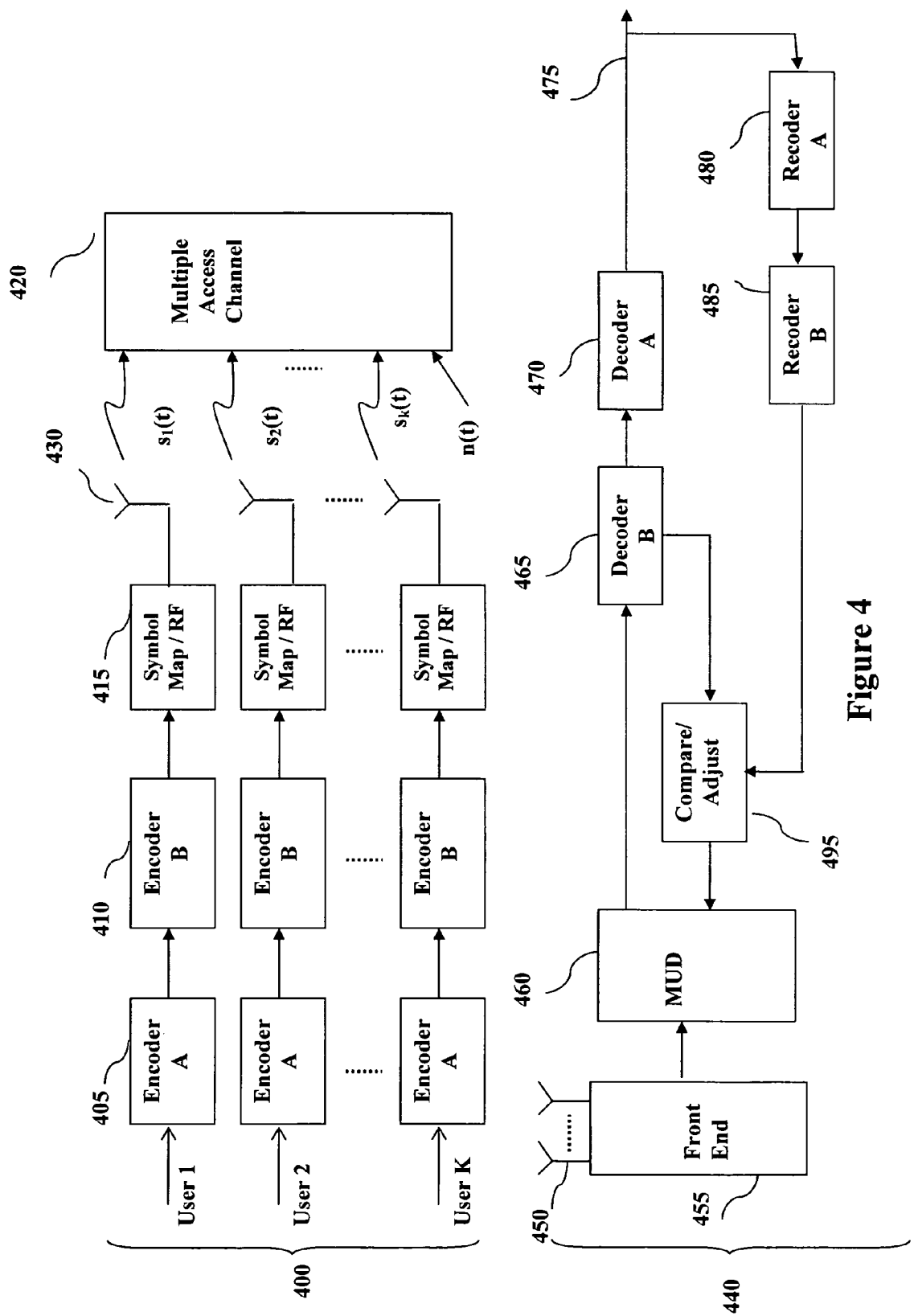
FIG. 4 diagrammatically illustrates one approach of the present invention showing the multiuser detection with two decoder stages, two recoder stages, and a compare and adjust unit.

Referring to FIG. 4, one implementation of the present invention is depicted in block diagrammatic perspective for a communications system. Unlike the Figure-8 processing loop described in FIG. 3a and FIG. 3b, the invention depicted in FIG. 4 is an alternative solution for the same types of processing situations wherein the transmitter uses two or more codes and employs a channel (for example multi-access, multi-path, storage/retrieval) that "looks" like a code.

The implementation of the present invention is described for the receiver section 440, but the transmitter section 400 is shown for completeness and illustrative purposes. There are K users wherein each user I has a data stream di as the input to a plurality of Channel Encoders 405 and 410. The K users may or may not be co-located. There is a Channel Encoder A 405, and a Channel Encoder B 410 that encode the data for each user according to the rules applicable to the transmission protocol. For example, Channel Encoder A 405 could be a Reed-Solomon block code and Channel Encoder B 410 could be a rate ½, memory order 9, convolutional code. In another embodiment, Channel Encoder A 405 could be a rate ½ convolutional encoder and Channel Encoder B 410 could be a different rate ½ convolutional encoder. In another embodiment, Channel Encoder A could be a convolutional code and Channel encoder B could be a repetition code. The encoded data stream from each user is modulated by modulation/RF unit 415 that conditions the signals for transmission, producing a data signal si(t) for each user. Each signal is then transmitted by an antenna element 430 over a multiple access channel 420.

In one embodiment, there may be one or more interleavers (not shown) in the transmission chain that performs the interleaving of the data. The purpose of the interleavers is to re-order the data. If interleavers are present in the transmission chain, then the placement of corresponding deinterleavers in the receiver processing chain will be readily apparent to those skilled in the art. For ease of explanation, the potential presence of interleavers and deinterleavers is ignored in the discussion. The transmission on hard-wire communication systems, or other electronic media such as data storage media, is also known in the art, and while the present example is directed towards the wireless communications systems, the inventive concept is not limited to the wireless embodiment nor to communications systems. Noise n(t), such as white Gaussian noise, is an inherent component of most transmission signals and some random noise components are generally present in transmitted data signals r(t).

On the receiving end 440, one or more antennas 450 receive the received signal r(t), which is an aggregate of the K transmitted signals s(t) as well as other various interfering signals and noise, such as n(t). For discussion purposes, it will be assumed that one antenna is used at the receiver, but the concept holds for multiple-antenna systems as well. The aggregate signal is received at antenna 450 wherein there is one signal produced for each polarization feed. The measured signal represents directly received signals, as well as multi-path signals from the same user, and interfering signals from other users.

The measured data from antenna 450 is processed in a RF front end unit 455. The front end unit 455 downconverts the higher frequency signals into baseband data and provides processing and filtering as is known in the art, such as whitening filters. The front end 455 performs any parameter estimation and filtering to retrieve accurate information for the signals such as relative received timing offsets, carrier phase, frequency offsets, received amplitudes, and multipath structure for each of the interfering signals present in the received signal. There may also be preprocessing that converts the baseband digital data into the proper format for further processing according to the desired detection scheme. The format is often one measurement per 'dimension' per symbol, and one example of this processing is a bank of matched filters.

The input data is then input to a MUD stage 460. The MUD unit 460 may contain any multiuser detection processing as known in the art, such as M-algorithm, T-algorithm, Q-algorithm, maximum likelihood joint detection, MMSE, and decorrelator, decision feedback detector.

For each iteration, the MUD 460 operates on the input signals to pass soft decisions in the form of reliability, or confidence, measures to a bank of decoders, Decoder B 465 as known in the art, for example, decoders as described in Alexander, Reed, Asenstorfer, and Schlegel, "Iterative Multiuser Interference Reduction: Turbo CDMA," IEEE Trans. On Comms., v41, n7, July 1999. The Decoder B bank of decoders 465 contains one decoder for each of the K users.

The type of decoder that is present in Decoder B decoders 465 depends on the type of Encoder B 610. Thus in one embodiment, Decoder B 465 is chosen to reverse the process done in Encoder B 410. The bank of Decoders B decoders 465 produces estimates of the decoded bits that are output to Decoder A 470, and also generates soft values for the coded symbols that are output to the Compare and Adjust section 495. One example of Decoder B 465 is a bank of single user decoders such as BCJR convolutional decoders, as known in the art and described in C. Schlegel, Trellis Coding, IEEE Press, 1997.

The estimates from Decoder B 465 are passed to a Decoder A bank of decoders 470. The Decoder A bank of decoders 470 uses these estimates and determines estimates of the message bits from decoded bits from Decoder B 465. One example of the Decoder A bank of decoders 470 is the Reed Solomon block decoders.

The hard message estimates from Decoder A 480 subject to iterative processing are subsequently re-coded by Recoder A 480. The Recoder A 480 uses the same encoding rules that were imposed at the transmitter for each user and recodes the hard estimates from the Decoder A decoders 470.

The recoded values from the Recoder A 480 are then processed by Recoder B 485. More particularly, the Recoder A output values are recoded by a bank of encoders in Recoder B 480 using the encoding rules that were imposed at the transmitters in Encoder B 410. The output of the bank of Recoder B recoders 485 are hard-valued coded symbols.

The hard-valued coded symbols from the bank of Recoder B recoders 485 are processed by the Compare and Adjust section 495. The Compare and Adjust unit 495 compares the hard (recoded) symbols from Recoder B 485 with the soft conditional outputs from Decoder B, and 'adjusts' the soft values when the values conflict as described herein. The adjusted soft values from the Compare and Adjust unit 495 are then passed to MUD unit 460 for the next iteration processing.

The Compare and Adjust unit 495 compares the soft estimates from Decoder B with the hard recoded bits from Recoder B and in one embodiment adjusts the soft estimates for the coded symbols closer to 0.5 (or undefined state) in instances for which the hard recoded bits disagree with the soft estimates. Similarly the Compare and Adjust unit 495 adjusts the soft estimates for the coded symbols closer to '0' to '1' in instances for which the recoded symbols agree with the soft estimates. There are several possible variations, and two extreme versions of this function are changing the estimates to the completely unknown (0.5) or completely known (0.0/1.0) states.

Other embodiments of the compare and adjust unit use a smooth input-output function defined over the interval. For example, assume that the soft estimates range in value from 0 to 1 and are denoted b and that the hard estimate values are either 0 or 1 and are denoted b̂. The compare and adjust process determines the adjustment amount $b_{adj}$ to apply to the soft estimate, resulting in a new soft estimate $b_{new}$= b+$b_{adj}$. The compare and adjust unit 495 processes this determination for every symbol for each user. The determination of $b_{adj}$ is through a function using the difference of the soft and hard values, b-b̂ as its input, and the adjustment value $b_{adj}$ as its output. The function used by the compare and adjust unit 495 depends on the desired implementation/application.

Figure 5A:
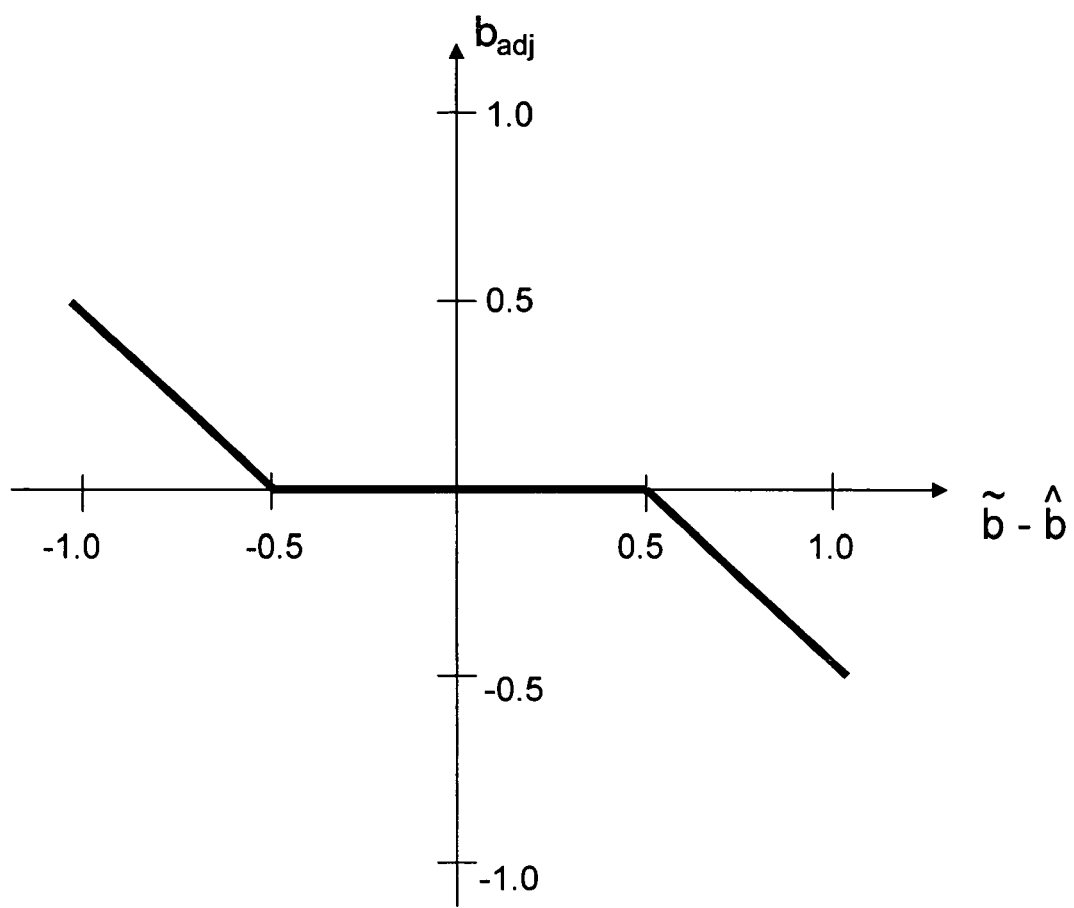
FIG. 5a graphically illustrates one representative embodiment of the compare and adjust adjustment functions.

For instance, if the implementer wants to adjust the soft values when they disagree with the hard values, but not adjust when there is agreement between the soft and hard values, $b_{adj}$ would be equal to 0 for values of b-b̂ between −0.5 and 0.5, and then could be equal to the value given by—($\bar{b}$—$\bar{b}$). The new, adjusted value is $b_{new}=b=\bar{b}+b_{adj}$. A plot of this embodiment of the compare and adjust function for the determination of $b_{adj}$ is shown in FIG. 5a.

Figure 5B:
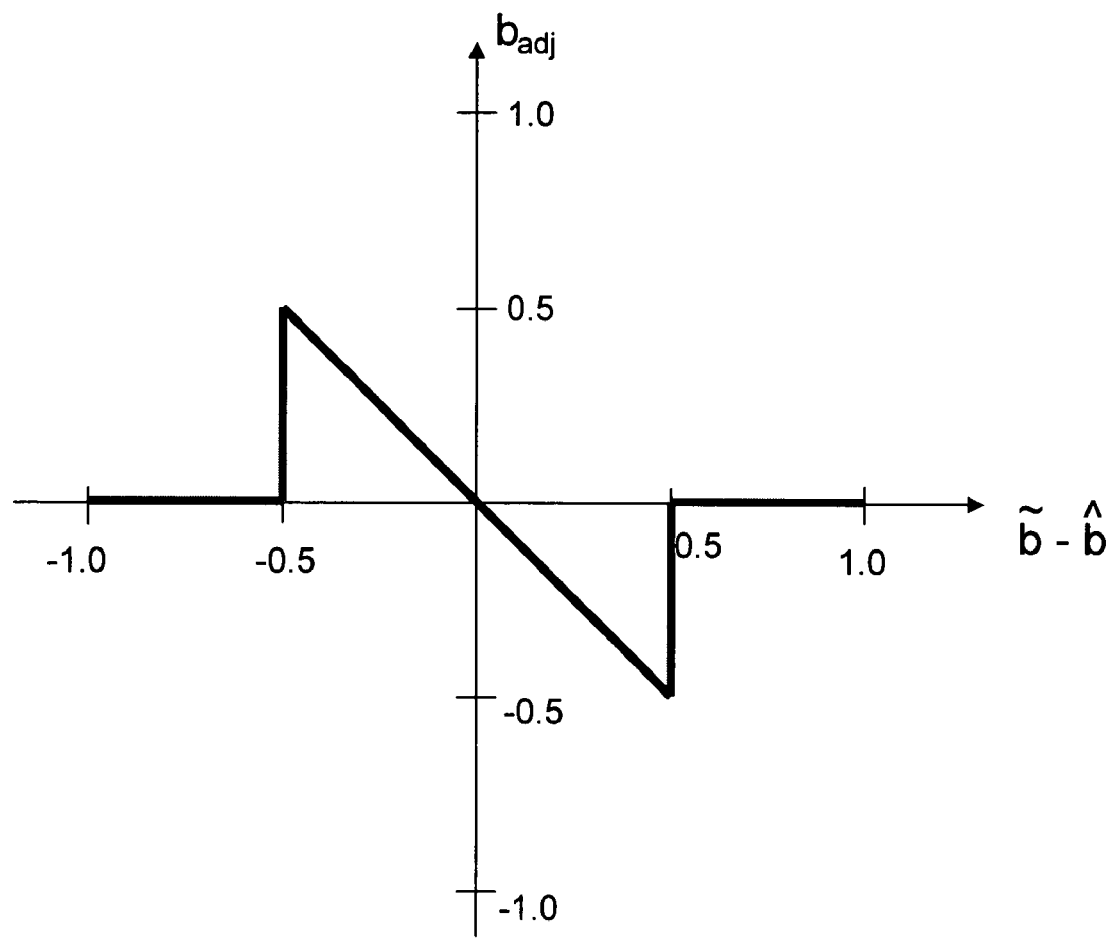
FIG. 5b graphically illustrates one representative embodiment of the compare and adjust adjustment functions.

In another embodiment, if the implementer wished to adjust the soft estimates toward the values that indicate more confidence when the soft and hard values agree but does not want to change the soft estimates when they disagree with the hard estimates, the implementer could use the function shown in FIG. 5b to determine $b_{adj}$ and derive $b_{new}=\bar{b}+b_{adj}$.

Figure 5C:
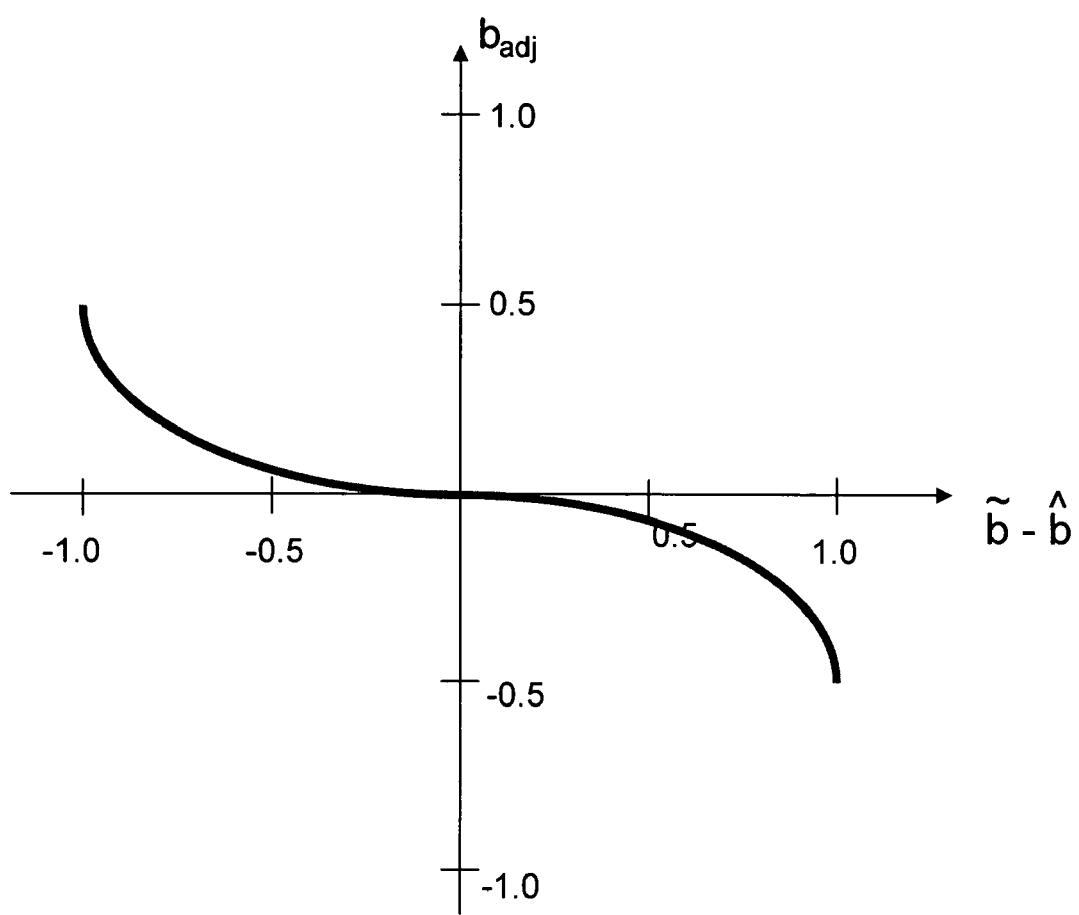
FIG. 5c graphically illustrates one representative embodiment of the compare and adjust adjustment functions.
Figure 5D:
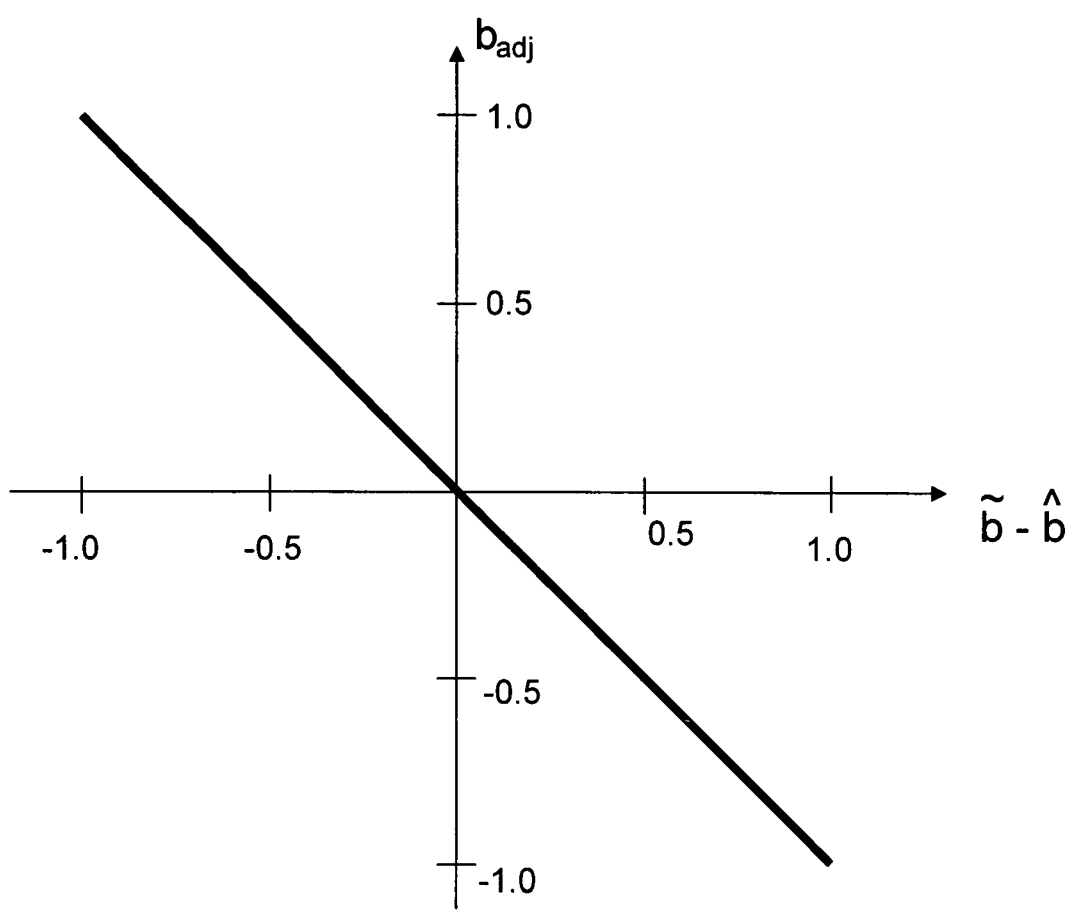
FIG. 5d graphically illustrates one representative embodiment of the compare and adjust adjustment functions.

A smooth adjustment function as shown in FIG. 5c is yet another embodiment for the determination of the adjustment term $b_{adj}$. If the soft values are deemed completely unreliable and the hard values are to be passed through to the next stage, the function for $b_{adj}$ could look like the function in FIG. 5d. The embodiments of the compare and adjust functionality presented herein are not intended to limit the scope of the invention. Rather, these examples are offered as illustrative of the compare and adjust process and other functions are within the scope of the invention.

The number of iterations for processing between the MUD block 460, the subsequent processing in the decoders 465 and 470, the recoders 480 and 485, and the compare/adjust 495 can be set to a fixed counter, time period, or can be variable, dependent on the performance, for example by checking if there were significant changes to the data from the last iteration. Once the data is no longer being altered, or is being altered within acceptance tolerance levels, or reaches a certain iteration counter limit, the data from the decoder 470 can be output as final estimates 475 of what the user sent. Operation can then commence for the next block or frame of data, repeating the process described herein.

Figure 6:
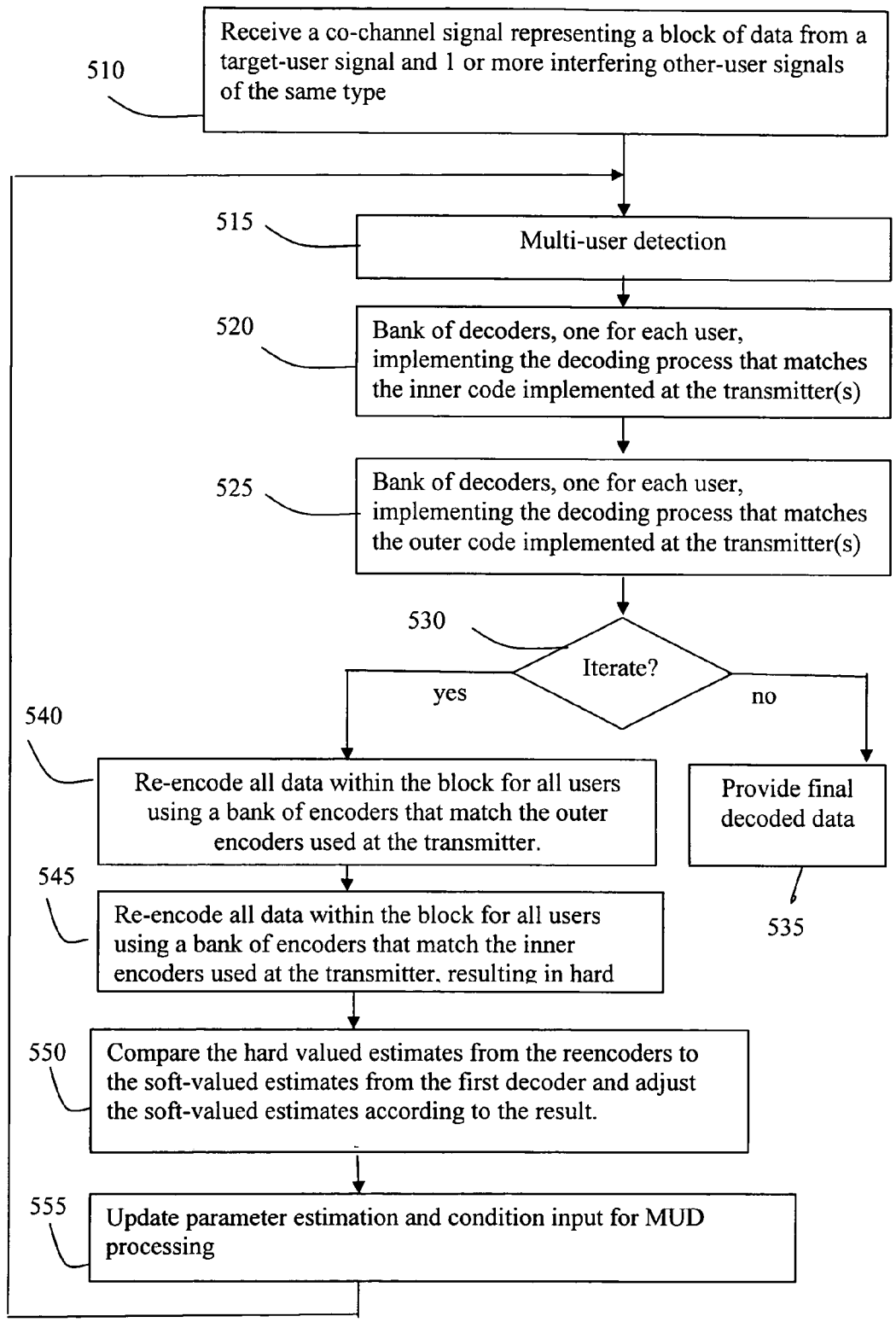
FIG. 6 is a flow chart illustrating the steps of for one embodiment of the present invention.
Figure 7:
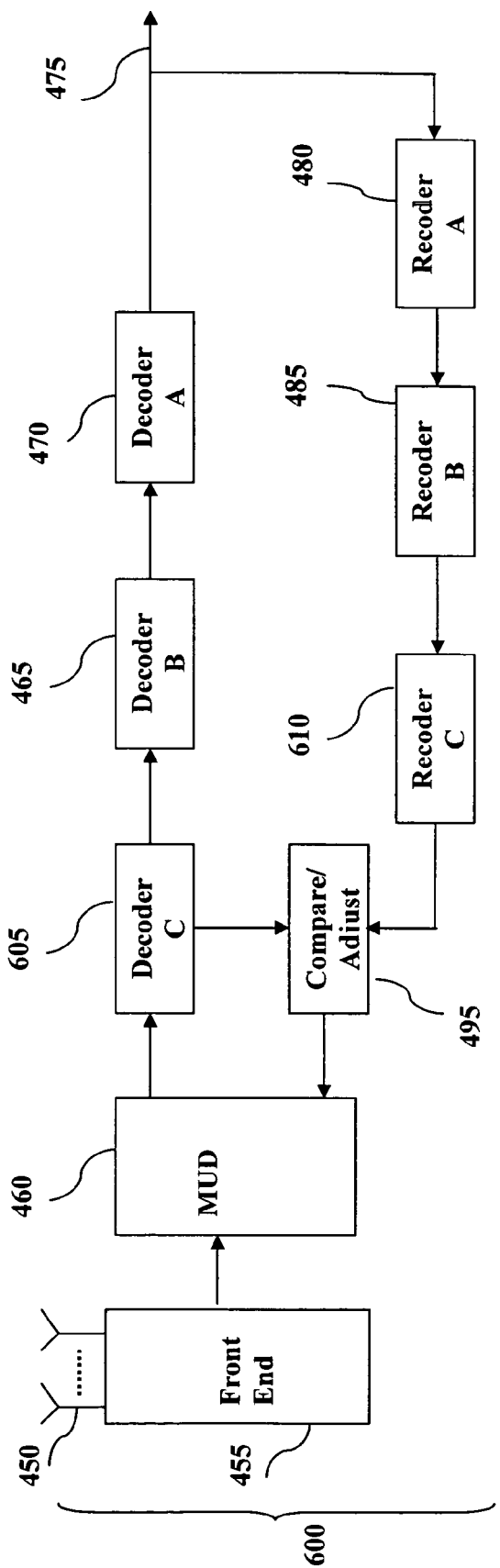
FIG. 7 diagrammatically illustrates one embodiment of the present invention showing the multiuser detection with three decoder stages, three recoder stages, and a compare and adjust unit.

Referring to FIG. 6, the processing flow for one further embodiment is depicted. It is assumed that the signals have been pre-processed by a front-end (not shown) to some extent and arrive as a digital stream of data. The digital data stream can be filtered and is subject to parameter estimation, wherein the received co-channel signal includes a target-user signal and one or more interfering signals 510. The parameter estimation determination and any subsequent refinements of parameter estimates are not depicted but are assumed present.

A multi-user detector unit processes the data and generates confidence or reliability values for the signals 515. There is one reliability measure associated with each symbol of each user. The MUD operation can be any of those known in the art, such as MMSE MUD, tree-pruned MUD or Q-algorithm MUD, for instance.

The next step is applying an inner decoder to the signal of each user in a bank of decoders 520. Each decoder within the bank of decoders determines conditional probabilities for the received symbols as well as estimates of the decoded bits. The estimates of the decoded bits are passed to the next bank of decoders, and the soft values of the symbols, e.g. conditional probabilities, are used later by the compare and adjust unit.

The next step in the process is applying an outer decoder to the signal of each user in a bank of decoders 525. The output of the bank of outer decoders is estimates of the original data bits for all of the users.

If there are no further iterations 530, the determination of which may be based on performance-based metrics, time metrics, or iteration counts, the estimates of the data are provided as final estimates to the destination 535.

If further iterations are deemed necessary, the next step is to re-encode the data with a bank of encoders that match the outer encoders used at each user's transmitter 540.

The next step is to re-encode the data using a bank of encoders that match the inner encoders used at each user's transmitter 545. The re-encoders provide hard-valued data for each user.

The next step is a comparison of the soft-valued data generated previously in step 520 with the hard-valued data from the recoding process and then adjusting the soft-valued data 550.

The next step is the parameter estimation updates and signal conditioning that is required for the chosen MUD approach 555. The data is then passed to the MUD step 515. The processing continues in this manner until iterating ends 530 and a final set of decoded data is output 535.

The embodiment depicted in FIG. 6 shows the reception and processing portion of a three decoder and three recoder system. It should be readily apparent that the transmission portion (not shown) would complement the receiver section 600.

As described in relation to FIG. 4 and further shown in FIG. 6, the data signals are processed on the receiving end 500. Antennas 450 receive the received signal r(t), which is an aggregate of the K transmitted signals s(t) as well as other various interfering signals and noise, such as n(t). The measured signal represents directly received signals, as well as multi-path signals from the same user, and interfering signals from other users. The measured data from antenna 450 is processed in a RF front end unit 455. The front end unit 455 downconverts the higher frequency signals into baseband data and provides processing and filtering. The front end 455 performs any parameter estimation to retrieve accurate information for the signals such as relative received timing offsets, carrier phase, frequency offsets, received amplitudes, and multipath structure for each of the interfering signals present in the received signal. There may also be preprocessing that converts the baseband digital data into the proper format for further processing according to the desired detection scheme.

The input data from the front-end 455 is then input to a MUD stage 460. For each iteration the MUD 460 operates on the input signals to pass soft decisions in the form of reliability, or confidence, measures to a bank of decoders. The bank of Decoder C decoders 605 contains one decoder for each of the K users. As described herein, the decoders can be of any type and correspond to the type of encoder used during the transmission to reverse the transmission encoding for that respective encoder. The bank of Decoders C decoders 605 produces estimates of the decoded bits that are output to Decoder B 465 and also generates soft values for the coded symbols that are output to the Compare and Adjust section 495. The Decoder B bank of decoders 465 also contains one decoder for each of the K users. Decoder B 465 is chosen to reverse the process done in Encoder B 410. The bank of Decoders B decoders 465 produces estimates of the decoded bits that are output to Decoder A 470.

The estimates from Decoder B 465 are passed to a Decoder A bank of decoders 470. The Decoder A bank of decoders 470 uses these estimates and determines estimates of the message bits from decoded bits from Decoder B 465.

The hard message estimates from Decoder A 480 subject to iterative processing are subsequently re-coded by Recoder A 480. The Recoder A 480 uses the same encoding rules that were imposed at the transmitter for each user and recodes the hard estimates from the Decoder A decoders 470.

The recoded values from the Recoder A 480 are then processed by Recoder B 485. More particularly, the Recoder A output values are recoded by a bank of encoders in Recoder B 480 using the encoding rules that were imposed at the transmitters in Encoder B 410. The output of the bank of Recoder B recoders 485 are hard-valued coded symbols.

The recoded values from the Recoder B 485 are then processed by Recoder C 610. More particularly, the Recoder B output values are recoded by a bank of encoders in Recoder C 610 using the encoding rules that were imposed at the transmitters for that encoder. The output of the bank of Recoder C recoders 510 are hard-valued coded symbols.

The hard-valued coded symbols from the bank of Recoder C recoders 610 are processed by the Compare and Adjust section 495. The Compare and Adjust unit 495 compares the hard (recoded) symbols from Recoder C 610 with the soft conditional outputs from Decoder C 605, and 'adjusts' the soft values when the values conflict as described herein. The adjusted soft values from the Compare and Adjust unit 495 are then passed back to MUD unit 460 for the next iteration processing.

Thus, in one embodiment the present invention includes a multi-user detector serially coupled to at least two decoder sections, at least two recoder sections, and at least one compare and adjust unit in such a manner that data flows iteratively through the elements and back to the MUD to correct for errors. The decoders can be any type of decoder implemented with the MUD, including any type of block or convolutional modeled code. The decoders can be both block decoders, both convolutional decoders, or one block decoder and one convolutional decoder. The compare and adjust units can compare all soft inputs or a combination of soft and hard inputs in order to produce the recalculated soft values using an averaging or weighted calculation. The innovation of the approach described herein is a result of the method in which the units interact, and is not restricted to a certain type of decoder placement. That is, the innovation described herein is a result of the processing flow with which the units interact. Furthermore, the approach can be used when other types of codes or combinations of codes are used, i.e. this approach is not restricted to the block-convolutional code-multiple access channel situation. For instance, instead of MUD processing that compensates for the multiple access effects as described above, channel equalization processing that compensates for the channel effects of mulitpath fading may be done, so that the approach applies to the doubly-coded multipath channel as well.

The subject of the invention disclosed in this application does not require that the signals correspond to any particular multiple access (MA) scheme, or any limitation to wireless processing. For example, the present invention operates in the same manner on any set of digitally modulated interfering signals to include cellular CDMA systems, TDMA systems, FDMA systems, storage medium, wired MA systems such a cable modems, disk drives, wireless local area network systems, or yet undetermined systems. For example, Spatial Division Multiple Access (SDMA) is generally a satellite communications mode that optimizes the use of radio spectrum and minimizes system cost by taking advantage of the directional properties of dish antennas, and benefits from the bit processing described herein. The only requirement for viable operation of the present invention is that each signal source produces a signal with the information digitally modulated using a signature pulse or finite duration signal of some sort. While CDMA is described for illustrative purposes to explain the invention, the specific example of CDMA is merely for ease of understanding. The present invention is directed to any other form of digital communication or signal storage methods by simply replacing the words in the CDMA discussions "signature sequence" with "signature signal" or "signature pulse" and replacing the words "CDMA signal" with "digitally modulated signal".

Furthermore, any reference to 'users' is not intended as a limitation to a plurality of communication users but rather in the broader sense to represent any group of signals having a target signal and at least one interfering signal. For example, the commonly assigned published application U.S. 2004/0037202 A1, entitled "Multichannel digital recording system with multi-user detection" which is commonly owned and incorporated by reference for all purposes. This patent application describes the usage of multiuser detection in relation to disk drives and extracting multiple signals from the disk.

A further feature of the present invention is that it works equally well using mixed rate communication systems such as IS95, wherein the user chooses the transmission rate. The parameter estimator that handles the differing transmission rates passes along the information to the present system. Based upon the performance results of turboMUD methods and the recognition that topologies like the Astrolink system using GSM, IS-95 system, and other communication methods have two or more serially concatenated codes in their transmission processing chain, as well as a channel that can be modeled as a convolutional code, the present invention incorporates multiple codes in a turbo-decoding receiver. For example, state of the art decoders contain a Reed-Solomon (RS) block code in addition to a convolutional code and multiuser interference that are typically addressed by the turboMUD. The state of the art decoders for such systems use a straightforward partitioned (non-iterative) way of decoding the RS code at the receiver by simply appending a bank of RS decoders to the turboMUD unit.

It is readily apparent that reduced complexity multi TurboMUD decoding technique is useful in a variety of applications and with varied methods for implementing the system, and is therefore not limited to the embodiments presented herein. Diverse variations and modifications may be made without departing from the scope of the present invention. The methodology can be used to replace existing receivers without any modifications to the transmitters, thereby allowing service providers to offer improved performance without changing the signaling scheme. For example, cellular phones can operate with additional features and functionality added to the base station or tower.

Numerous characteristics and advantages have been set forth in the foregoing description, together with details of structures and functions, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

What is claimed is:

1. A processing system for digitally modulated information having a plurality of received signals, said system comprising:

a multiuser detector coupled to said received signals, wherein said multiuser detector produces a set of reliability measures for said received signals;

at least two decoder banks coupled to said multiuser detector, wherein said decoder banks produce a set of conditional probabilities and a set of bit estimates;

at least two recoder banks coupled to said decoder banks, wherein said recoder banks produce a set of recoded estimates; and a compare and adjust unit coupled to said multiuser detector, said decoder banks and said recoder banks, wherein said compare and adjust unit compares said recoded estimates and said conditional probabilities and produces a set of adjusted estimates.

2. The system according to claim 1, wherein said multiuser detector uses algorithms selected from at least one of the group consisting of: optimal joint detection MUD algorithm, M-algorithm, T-algorithm, MT algorithm, Q-algorithm, FANO algorithm, decorrelator MUD algorithm, MMSE MUD algorithm, and decision feedback MUD algorithm.

3. The system according to claim 1, further comprising a parameter estimator coupled to said multiuser detector.

4. The system according to claim 1, wherein at least one of said decoder banks are selected from at least one of the group consisting of: maximum a posteriori (MAP) decoders, soft-output Viterbi algorithm (SOVA) decoders, Bahl, Cocke, Jelinek, Raviv (BCJR) decoders, Reed-Solomon decoders, repetition code decoders, Hamming decoders, BCH decoders, Reed-Muller decoders, Block Cyclic decoders, Hadamard decoders, and Golay decoders.

5. The system according to claim 1, wherein at least one of said decoder banks are selected from at least one of the group consisting of: convolutional decoders and block decoders.

6. The system according to claim 1, wherein said adjusted estimates are calculated using a weighting function.

7. The system according to claim 1, further comprising a filter unit coupled to said multiuser detector.

8. The system according to claim 7, wherein said filter unit is selected from the group of filters consisting of: whitening matched filter bank and matched filter bank.

9. The system according to claim 1, further comprising iterative processing by said decoder banks, said recoder banks, said compare and adjust unit, and said multiuser detector until a final condition is obtained.

10. The system according to claim 9, wherein said final condition is selected from at least one of the group consisting of: allowable performance level, amount of time, and fixed number of iterations.

11. The system according to claim 1, further comprising interleavers and de-interleavers coupled to said multiuser detector, said decoder banks and said recoder banks.

12. A processing apparatus for multiple access communications channels, comprising:
a multiuser detector coupled to a plurality of user signals, wherein said multi-user detector produces a set of symbol estimates for each of said user signals;
a first bank of decoders coupled to said multiuser detector, wherein said first bank of decoders produces a set of bit estimates and a set of soft values for said symbol estimates;
a second bank of decoders coupled to said first bank of decoders processing said set of bit estimates and producing a set of hard estimates;
a first recoder coupled to said second bank of decoders, wherein said first recoder recodes said set of hard estimates and produces a set of hard recoded estimates;
a second recoder coupled to said first recoder, wherein said second recoder processes said set of recoded hard estimates and produces a set of hard recoded symbols; and a compare and adjust unit processing said set of hard recoded symbols and said set of soft values, wherein said compare and adjust unit produces a set of adjusted soft values, and wherein said adjusted soft values are coupled to said multiuser detector for iterative processing.

13. The apparatus according to claim 12, wherein said multi-user detector uses algorithms selected from at least one of the group consisting of: M-algorithm, T-algorithm, MT algorithm, Q-algorithm, and FANO algorithm, decorrelator MUD algorithm, MMSE MUD algorithm, and decision feedback MUD algorithm.

14. The apparatus according to claim 12, wherein said first bank of decoders are convolutional decoders.

15. The apparatus according to claim 14, wherein said convolutional decoders are selected from at least one of the group consisting of: maximum a posteriori (MAP) decoders, maximum likelihood decoders, soft-output Viterbi algorithm (SOVA) decoders, Bahl, Cocke, Jelinek, Raviv (BCJR) decoders, Fano decoders, sequential decoders, list decoders, and tree-pruning decoders.

16. The apparatus according to claim 12, wherein said second bank of decoders are block decoders.

17. The apparatus according to claim 16, wherein said block decoders are selected from at least one of the group consisting of: Reed-Solomon decoders and repetition code decoders.

18. The apparatus according to claim 12, wherein said first bank of decoders and said second bank of decoders are selected from at least one of the group consisting of:
block decoders and convolutional decoders.

19. The apparatus according to claim 12, wherein said adjusted soft values are calculated by a weighting function.

20. The apparatus according to claim 12, further comprising a filter unit coupled to said user signals and said multiuser detector.

21. The apparatus according to claim 20, wherein said filter unit is selected from the group of filters consisting of: whitening matched filter bank and matched filter bank.

22. The apparatus according to claim 12, further comprising iterative processing by said first bank of decoders, said second bank of decoders, said first bank of recoders, said second bank of recoders, said compare and adjust unit, and said multiuser detector until a final condition is obtained.

23. The apparatus according to claim 22, wherein said final condition is selected from the group consisting of: allowable performance level, amount of time, and fixed number of iterations.

24. The apparatus according to claim 12, further comprising interleavers and de-interleavers coupled to said multiuser detector, said first bank of decoders and said second bank of decoders.

25. A method of processing digitally modulated signals, comprising:
receiving a digital data stream and processing a conditioned digital data stream;
performing multiuser detection of said conditioned digital data stream and generating a set of reliability measures;
applying an inner decoding process to said conditioned digital data stream producing a set of bit estimates and a set of conditional probabilities;
applying an outer decoding process to said bit estimates and producing a set of information bits;
re-encoding said information bits using an outer encoding process;

re-encoding said information bits using an inner encoding process producing a set of re-encoded estimates;

comparing said conditional probabilities to said re-encoded estimates and producing a set of adjusted conditional probabilities for said conditioned digital data stream; and providing a final set of said information bits upon a final condition.

26. The method according to claim 25, further comprising filtering said digital data stream.

27. The method according to claim 25, wherein processing said conditioned digital data stream comprises parameter estimation.

28. The method according to claim 25, wherein said final condition is selected from the group consisting of: performance-based metrics, time metrics, and iteration counts.

29. The method according to claim 25, further comprising steps of interleaving and de-interleaving.

* * * * *